(12) United States Patent
Haruta

(10) Patent No.: US 10,798,267 B2
(45) Date of Patent: Oct. 6, 2020

(54) IMAGE PROCESSING TO SET OUTPUT PIXEL VALUES SUBJECT TO EDGE OR THIN LINE CORRECTION

(71) Applicant: CANON KABUSHIKI KAISHA, Tokyo (JP)

(72) Inventor: Kenichirou Haruta, Nagareyama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/679,022

(22) Filed: Nov. 8, 2019

(65) Prior Publication Data

US 2020/0162635 A1 May 21, 2020

(30) Foreign Application Priority Data

Nov. 21, 2018 (JP) ................. 2018-218285

(51) Int. Cl.
| | | |
|---|---|---|
| H04N 1/409 | (2006.01) | |
| H04N 1/405 | (2006.01) | |
| G06T 5/00 | (2006.01) | |
| G06T 7/13 | (2017.01) | |
| H04N 1/58 | (2006.01) | |
| G06K 15/02 | (2006.01) | |
| G06K 9/62 | (2006.01) | |
| H04N 1/52 | (2006.01) | |

(52) U.S. Cl.
CPC ......... *H04N 1/4092* (2013.01); *G06K 9/6201* (2013.01); *G06K 15/1874* (2013.01); *G06K 15/1881* (2013.01); *G06T 5/002* (2013.01); *G06T 7/13* (2017.01); *H04N 1/405* (2013.01); *H04N 1/52* (2013.01); *H04N 1/58* (2013.01)

(58) Field of Classification Search
CPC .......... H04N 1/40081; H04N 1/40087; H04N 1/405–1/4058; H04N 1/409; H04N 1/4092; H04N 1/52; H04N 1/58; G06T 5/002; G06T 7/13; G06K 15/1869–1881
See application file for complete search history.

(56) References Cited

U.S. PATENT DOCUMENTS

| | | | | |
|---|---|---|---|---|
| 5,408,338 A | * | 4/1995 | Koike | ................ H04N 1/40075 358/447 |
| 7,057,776 B2 | * | 6/2006 | Akiyama | ............... G06K 15/02 358/462 |

FOREIGN PATENT DOCUMENTS

| | | |
|---|---|---|
| JP | 10-42141 A | 2/1998 |
| JP | 2016-167777 A | 9/2016 |

* cited by examiner

*Primary Examiner* — Scott A Rogers
(74) *Attorney, Agent, or Firm* — Canon U.S.A., Inc. IP Division

(57) ABSTRACT

An image processing unit detects an edge portion of an input image and outputs first data for correcting the detected edge portion. The image processing unit also detects a thin line in the input image and outputs second data for correcting the detected thin line. In a case where a pixel of interest is subjected to both correction processes using the first data and the second data, a greater correction amount is selected and the correction is made using the selected correction amount, and a result corrected image is output as an output image.

12 Claims, 18 Drawing Sheets

FIG. 4

| 00 | 10 | 20 | 30 | 40 | 50 | 60 |
|----|----|----|----|----|----|----|
| 01 | 11 | 21 | 31 | 41 | 51 | 61 |
| 02 | 12 | 22 | 32 | 42 | 52 | 62 |
| 03 | 13 | 23 | 33 | 43 | 53 | 63 |
| 04 | 14 | 24 | 34 | 44 | 54 | 64 |
| 05 | 15 | 25 | 35 | 45 | 55 | 65 |
| 06 | 16 | 26 | 36 | 46 | 56 | 66 |

FIG. 7

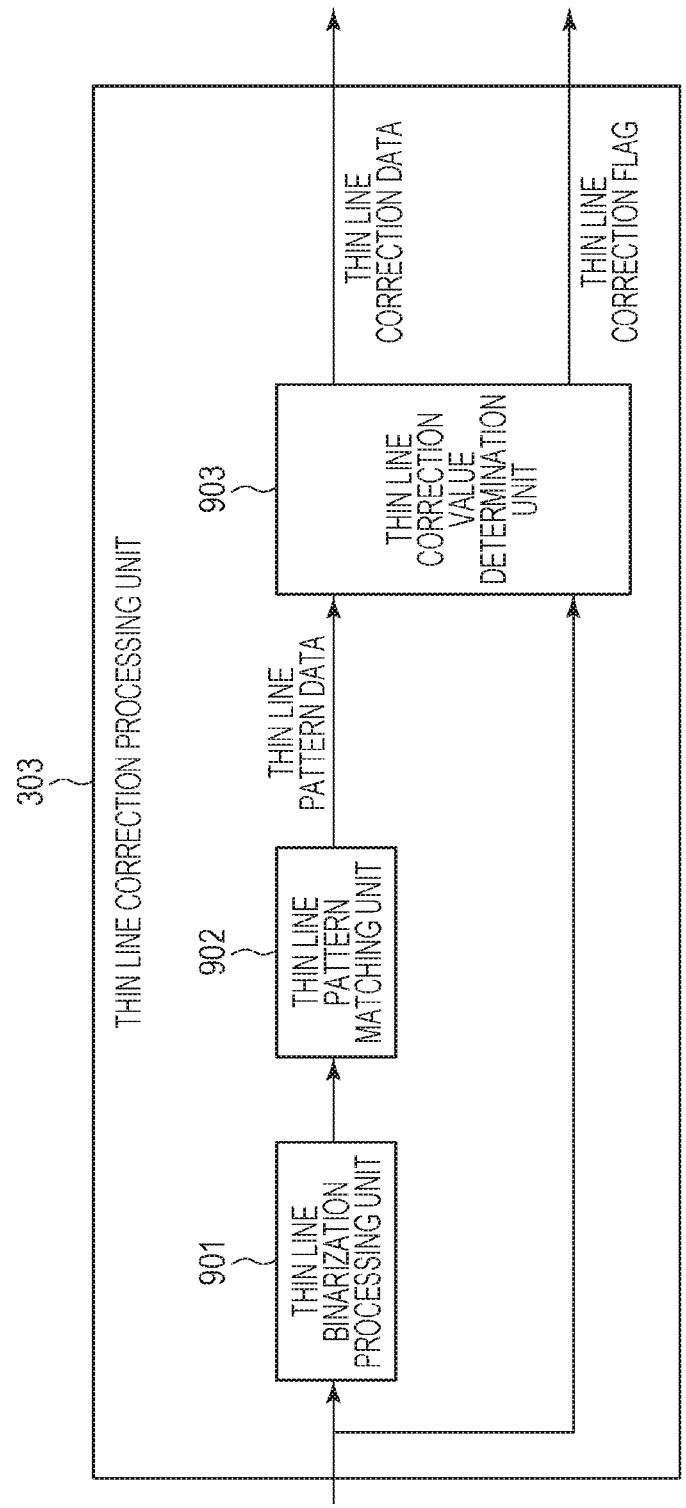

| | | | | | | | |
|---|---|---|---|---|---|---|---|
| 0 | 0 | 0 | 0 | 0 | 0 | 0 | |
| 0 | 0 | 0 | 0 | 0 | 0 | 0 | |
| 0 | 0 | 0 | 0 | 0 | 0 | 0 | |
| 0 | 0 | 0 | 0 | 255 | 255 | 255 | |
| 255 | 255 | 255 | 255 | 255 | 255 | 255 | |
| 255 | 255 | 255 | 255 | 255 | 0 | 0 | |
| 0 | 0 | 0 | 0 | 0 | 0 | 0 | |
| 0 | 0 | 0 | 0 | 0 | 0 | 0 | |

(labels 1406, 1402, 1401)

FIG. 14B

| | | | | | | |
|---|---|---|---|---|---|---|
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |
| 0 | 0 | 0 | 0 | 15 | 15 | 15 |
| 15 | 15 | 15 | 15 | 15 | 15 | 15 |
| 15 | 15 | 15 | 15 | 15 | 0 | 0 |
| 0 | 0 | 0 | 0 | 0 | 0 | 0 |
| 0 | 0 | 0 | 0 | 0 | 0 | 0 |

FIG. 14C (label 1403)

| | | | | | | |
|---|---|---|---|---|---|---|
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |
| 0 | 0 | 0 | 0 | 1 | 1 | 1 |
| 1 | 1 | 1 | 1 | 1 | 1 | 1 |
| 1 | 1 | 1 | 1 | 1 | 0 | 0 |
| 0 | 0 | 0 | 0 | 0 | 0 | 0 |
| 0 | 0 | 0 | 0 | 0 | 0 | 0 |

FIG. 14D (1404)

| | | | | | | |
|---|---|---|---|---|---|---|
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |
| 0 | 0 | 0 | 1 | 1 | 0 | 0 |
| 0 | 0 | 0 | 0 | 0 | 0 | 0 |
| 0 | 0 | 0 | 1 | 1 | 0 | 0 |
| 0 | 0 | 0 | 0 | 0 | 0 | 0 |
| 0 | 0 | 0 | 0 | 0 | 0 | 0 |

FIG. 14E (1405)

| | | | | | | |
|---|---|---|---|---|---|---|
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |
| 0 | 0 | 0 | 5 | 10 | 15 | 15 |
| 15 | 15 | 15 | 15 | 15 | 15 | 15 |
| 15 | 15 | 15 | 15 | 10 | 5 | 0 |
| 0 | 0 | 0 | 0 | 0 | 0 | 0 |
| 0 | 0 | 0 | 0 | 0 | 0 | 0 |

FIG. 14F (1407)

| | | | | | | |
|---|---|---|---|---|---|---|
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |
| 0 | 0 | 0 | 0 | 1 | 1 | 1 |
| 1 | 1 | 1 | 1 | 1 | 1 | 1 |
| 1 | 1 | 1 | 1 | 1 | 0 | 0 |
| 0 | 0 | 0 | 0 | 0 | 0 | 0 |
| 0 | 0 | 0 | 0 | 0 | 0 | 0 |

FIG. 14G (1408)

| | | | | | | |
|---|---|---|---|---|---|---|
| 0 | 0 | 0 | 0 | 0 | 0 | 0 |
| 0 | 0 | 0 | 0 | 0 | 0 | 0 |
| 0 | 0 | 0 | 0 | 0 | 2 | 2 |
| 2 | 2 | 2 | 2 | 0 | 1 | 1 |
| 1 | 1 | 1 | 1 | 0 | 1 | 1 |
| 1 | 1 | 1 | 1 | 0 | 2 | 2 |
| 2 | 2 | 2 | 2 | 0 | 0 | 0 |
| 0 | 0 | 0 | 0 | 0 | 0 | 0 |

FIG. 14H (1409)

| | | | | | | |
|---|---|---|---|---|---|---|
| 0 | 0 | 0 | 0 | 0 | 0 | 0 |
| 0 | 0 | 0 | 0 | 0 | 0 | 0 |
| 0 | 0 | 0 | 0 | 0 | 10 | 10 |
| 10 | 10 | 10 | 10 | 15 | 15 | 15 |
| 15 | 15 | 15 | 15 | 15 | 15 | 15 |
| 15 | 15 | 15 | 15 | 15 | 10 | 10 |
| 10 | 10 | 10 | 10 | 0 | 0 | 0 |
| 0 | 0 | 0 | 0 | 0 | 0 | 0 |

FIG. 14I (1410)

| | | | | | | |
|---|---|---|---|---|---|---|
| 0 | 0 | 0 | 0 | 0 | 0 | 0 |
| 0 | 0 | 0 | 0 | 0 | 0 | 0 |
| 0 | 0 | 0 | 0 | 0 | 1 | 1 |
| 1 | 1 | 1 | 1 | 1 | 1 | 1 |
| 1 | 1 | 1 | 1 | 0 | 1 | 1 |
| 1 | 1 | 1 | 1 | 1 | 1 | 1 |
| 1 | 1 | 1 | 1 | 0 | 0 | 0 |
| 0 | 0 | 0 | 0 | 0 | 0 | 0 |

FIG. 14J (labels 1411, 1410, 1412)

| | | | | | | |
|---|---|---|---|---|---|---|
| 0 | 0 | 0 | 0 | 0 | 0 | 0 |
| 0 | 0 | 0 | 0 | 0 | 0 | 0 |
| 0 | 0 | 0 | 0 | 0 | 10 | 10 |
| 10 | 10 | 10 | 5 | 10 | 15 | 15 |
| 15 | 15 | 15 | 15 | 15 | 15 | 15 |
| 15 | 15 | 15 | 15 | 10 | 5 | 10 |
| 10 | 10 | 10 | 10 | 0 | 0 | 0 |
| 0 | 0 | 0 | 0 | 0 | 0 | 0 |

FIG. 14K (labels 1414, 1413, 1415)

| | | | | | | |
|---|---|---|---|---|---|---|
| 0 | 0 | 0 | 0 | 0 | 0 | 0 |
| 0 | 0 | 0 | 0 | 0 | 0 | 0 |
| 0 | 0 | 0 | 0 | 0 | 10 | 10 |
| 10 | 10 | 10 | 10 | 10 | 15 | 15 |
| 15 | 15 | 15 | 15 | 15 | 15 | 15 |
| 15 | 15 | 15 | 15 | 10 | 10 | 10 |
| 10 | 10 | 10 | 10 | 0 | 0 | 0 |
| 0 | 0 | 0 | 0 | 0 | 0 | 0 |

FIG. 16A, FIG. 16B, FIG. 16C, FIG. 16D, FIG. 16E, FIG. 16F, FIG. 16G, FIG. 16H, FIG. 16I, FIG. 16J, FIG. 16K

IMAGE PROCESSING TO SET OUTPUT PIXEL VALUES SUBJECT TO EDGE OR THIN LINE CORRECTION

BACKGROUND OF THE INVENTION

Field of the Invention

The present disclosure relates to an image processing apparatus, an image processing method, and a program, for performing a correction process on an image used for printing.

Description of the Related Art

Conventionally, it is known to provide a function (an edge smoothing function) of executing a correction process for reducing shakiness called jaggies generated at an edge part of a character or the like in an image processing apparatus (Japanese Patent Laid-Open No. 10-42141). A function is also known for correcting pixel values of pixels of a thin line and pixel values of pixels adjacent to pixels of a thin line (referred to as a thin line thickening function) so as to improve visibility of thin lines included in an image (Japanese Patent Laid-Open No. 2016-167777).

There is a possibility that a process by the edge smoothing function and a process by the thin line thickening function are both performed on an image. When a plurality of different image processes are performed on the same image as described above, it is known to define an image process whose result is given higher priority than to the result of the other image process and accordingly make setting of an apparatus operation in advance. When correction processes are performed on the same pixel, priorities for results of the correction processes are selected according to the setting.

The process is described below, by way of example, for a case where priority is given to suppressing edge jaggies. When a pixel correction by the edge smoothing function and a pixel correction by the thin line thickening function are performed on the same pixel, a priority may be set by way of example such that a correction result of the edge smoothing function is employed. In this case, there is a possibility that an abrupt change in density is created between two adjacent pixels, one of which has a density value reduced as a result of edge smoothing applied to this pixel, and the other subjected to thin line thickening. In this case, there is a possibility that edge smoothing is not achieved although the priority is given to reducing jaggies at an edge.

SUMMARY OF THE INVENTION

The present disclosure provides an apparatus including a first correction unit configured to detect an edge part of an input image and correct a pixel value in the detected edge part, a second correction unit configured to detect a thin line in the input image and correct a pixel value in the detected thin line, and an output unit configured to set a pixel value such that in a case where a pixel is subjected to pixel value corrections by both the first correction unit and the second correction unit, the pixel value is set to be equal to a greater one of a value obtained as result of the correction by the first correction unit and a pixel value obtained as a result of the correction by the second correction unit.

Further features of the disclosure will become apparent from the following description of exemplary embodiments with reference to the attached drawings.

BRIEF DESCRIPTION OF THE DRAWINGS

FIG. 4 is a diagram illustrating a reference area including a pixel of interest and surrounding pixels.

FIG. 7 is a schematic diagram illustrating by way of example edge judgment patterns.

FIG. 9 is a diagram illustrating an example of a hardware configuration of a thin line correction process unit.

FIG. 11 is a diagram illustrating by way of example thin line judgment patterns.

FIGS. 14A to 14K each are a diagram illustrating an output image.

FIGS. 16A to 16K each are diagram illustrating an output image according to the second embodiment.

DESCRIPTION OF THE EMBODIMENTS

Embodiments of the present disclosure are described below with reference to drawings. The following embodiments do not limit the scope of the disclosure defined in the claims, and all combinations of features described in the embodiments are not necessarily essential to the solution means of the disclosure.

First Embodiment

A first embodiment of an image processing apparatus according to the present disclosure is described below taking, as an example, an image processing apparatus 2 capable of executing a smoothing process and a thin line correction process.

Apparatus Configuration

Figure 1:
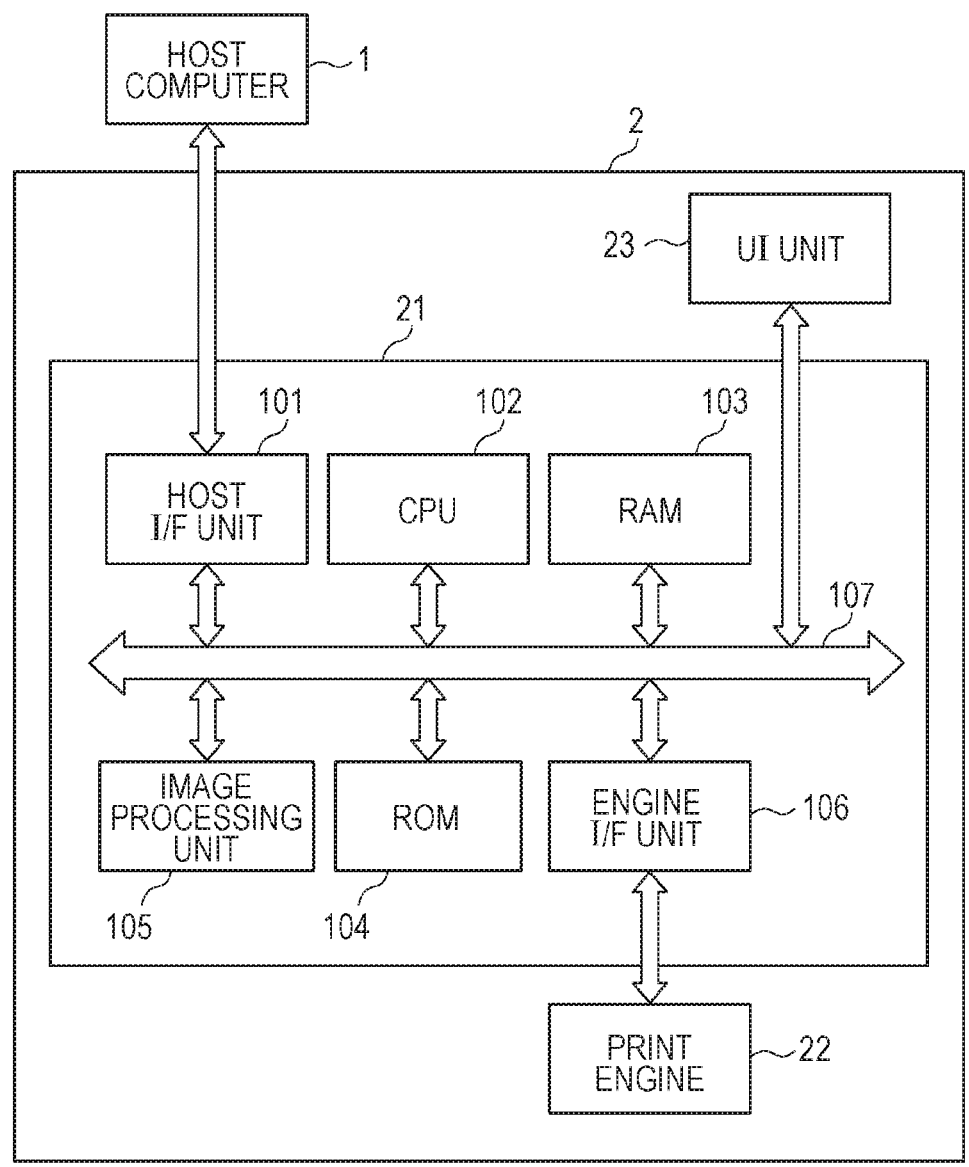
FIG. 1 is a diagram illustrating an example of a printing system.

FIG. 1 is a schematic diagram illustrating a system configuration according to the present embodiment. An image processing system shown in FIG. 1 includes a host computer 1 and an image forming apparatus 2. The host computer 1 is a computer such as a general personal computer (PC). An image or a document generated by a software application such as a printer driver (not shown) on the host computer 1 is transmitted as PDL (Page Description Language) data to the image forming apparatus 2 via a network. The image forming apparatus 2 has a function of receiving a print job including PDL data from the host computer 1 and printing an image on a sheet based on the print job.

In the present embodiment, an image forming apparatus having a printing function is described as an example of the image processing apparatus, but the image processing apparatus is not limited to such an image forming apparatus. For example, the image processing apparatus may be a print server configured to generate an image to be printed.

Next, a hardware configuration of the image forming apparatus 2 is described. The image forming apparatus 2 includes a controller 21, a print engine 22, and a UI (user interface) unit 23.

The controller 21 is connected to the print engine 22 and is configured to receive PDL data from the host computer 1, convert it into print data that can be processed by the print engine 22, and output the resultant print data to the print engine 22.

The print engine 22 prints an image on a sheet based on the print data output from the controller 21. The sheet on which the image is printed is discharged to a paper discharge unit (not shown). Note that it is assumed by way of example in the present embodiment that the print engine 22 is of an electrophotographic type.

The UI unit 23 is operated by a user to select various functions and to issue operation instructions. That is, the UI unit 23 functions as an accepting unit configured to accept a user operation and a display unit configured to present information to the user. The UI unit 23 includes a liquid crystal display having a touch panel on the surface, and a keyboard on which various keys such as a start key, a stop key, and a numeric keypad are disposed. Whether the thin line correction function and/or the edge smoothing function, which will be described later, are to be ON, is set in advance via a setting screen (not shown) and the setting is stored in the RAM 103, a configuration memory in the image processing unit 105, or the like. In the present embodiment, for convenience of explanation, it is assumed that both the edge smoothing function and the thin line correction function are set to be ON.

Next, details of the controller 21 are described. The controller 21 includes a host I/F (interface) unit 101, a CPU (Central Processing Unit) 102, and a RAM (Random Access Memory) 103. The controller 21 includes a ROM (Read Only Memory) 104, an image processing unit 105, an engine I/F unit 106, and an internal bus 107. The host I/F unit 101 is an interface for receiving PDL data transmitted from the host computer 1.

The CPU 102 controls the entire image forming apparatus 2 using a program and data stored in the RAM 103 and the ROM 104, and executes a process described later performed by the controller 21. The RAM 103 includes a work area used by the CPU 102 in executing various processes. The ROM 104 stores a program and data for causing the CPU 102 to execute various processes described later, and also stores setting data of the controller 21, and the like.

The image processing unit 105 performs image processing for printing on the PDL data received by the host I/F unit 101 according to settings given by the CPU 102, and generates print data that can be processed by the print engine 22. In particular, the image processing unit 105 generates image data having a plurality of color components per pixel by rasterizing the received PDL data. The plurality of color components are independent color components in a color space such as an RGB (red, green, blue) color space. The image data has an 8-bit value (256 gradations) for each color component for each pixel. That is, the image data is multi-value bitmap data including multi-value pixels. The image processing unit 105 generates print data by performing image processing such as color conversion from the RGB color space to a CMYK (cyan, magenta, yellow, black) color space, screen processing, and the like on the generated image data. The image processing unit 105 also performs an edge correction process, a thin line thickening process, and the like. Details of the image processing unit 105 will be described later.

The engine I/F unit 106 is an interface via which the print data generated by the image processing unit 105 is transmitted to the print engine 22. The internal bus 107 is a system bus for transmitting and receiving data and control commands to/from the units described above.

In the image processing by the image processing unit 105, there is a possibility that a process by the edge smoothing function and image processing by the thin line thickening function are both performed. When a plurality of different image processes are performed on the same image as described above, it is known to make, in advance, settings of an operation of an apparatus in terms of priority given to a result of each image process. When correction processes are performed on the same pixel, priorities for results of the correction processes are selected according to the setting.

Figure 18A:
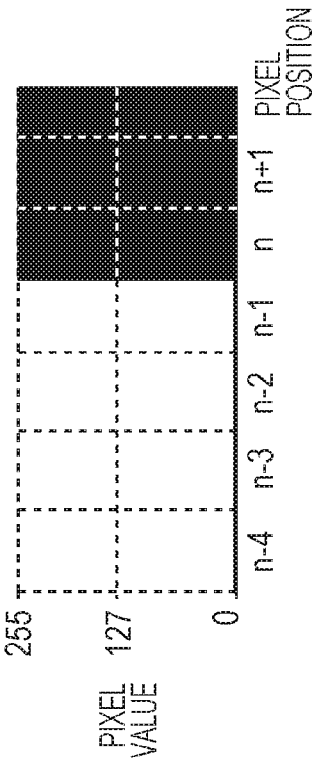
FIGS. 18A to 18F are diagrams illustrating an output result and an effect thereof obtained when a smoothing process and a thickening process according to a conventional technique are applied.

A specific example of a process is described below for a case where priority is given to suppressing edge jaggies. In this case, when a pixel correction by the edge smoothing function and a pixel correction by the thin line thickening function are performed on the same pixel, a correction result of the edge smoothing function may be always employed. In this case, there is a possibility that an abrupt change in density is created between two adjacent pixels, one of which has a density value reduced as a result of edge smoothing applied to this pixel, and the other subjected to thin line thickening. A specific example is described below with reference to FIGS. 18A to 18F. 18A to 18F are diagrams for explaining examples of image processing according to a conventional technique. FIG. 18A illustrates an example of an input image. When the input image shown in FIG. 18A is subjected to a thickening process and a smoothing process, these processes may be performed, for example, as described below with reference to FIG. 18B to FIG. 18F.

Figure 18C:
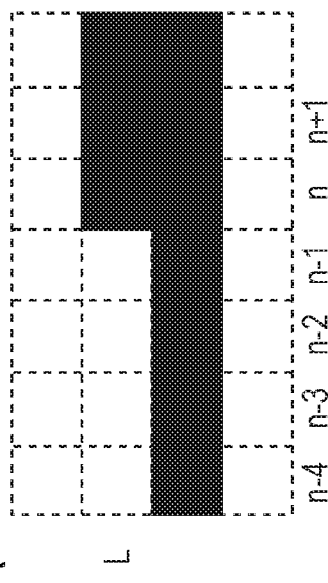
Figure 18E:
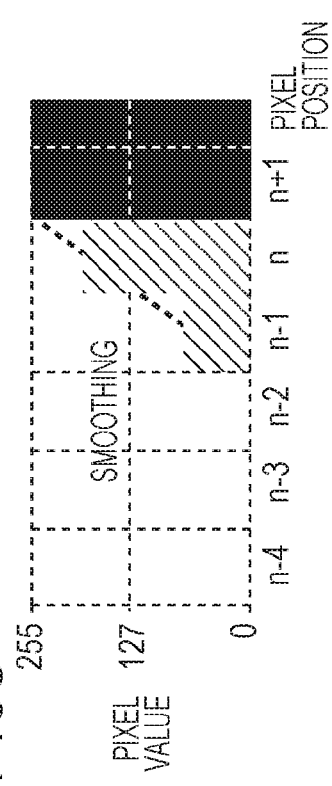
Figure 18B:
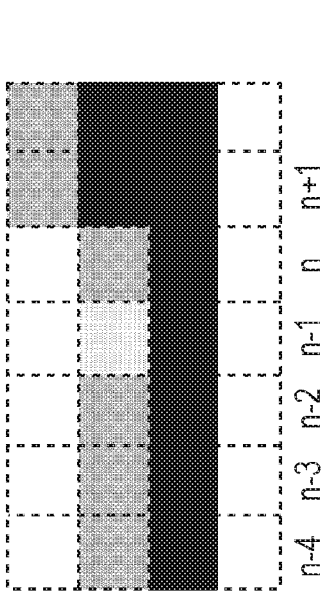

FIG. 18B shows pixel values (densities) of pixels (6 pixels at pixel positions from n−4 to n+1) arranged in a line denoted by L in FIG. 18A.

FIG. 18C is a diagram illustrating pixel values obtained when the smoothing process is performed on the pixels in the line illustrated in FIG. 18B. For example, the pixel value of the pixel at the pixel position n−1 is corrected from 0 to 85, and the pixel value of the pixel at the pixel position n is corrected from 255 to 170. As a result, the density increases stepwise from the pixel position n−2 to the pixel position n+1. Thus, the abrupt change in pixel value between the pixel position n−1 and the pixel position n is unsharpened.

Figure 18D:
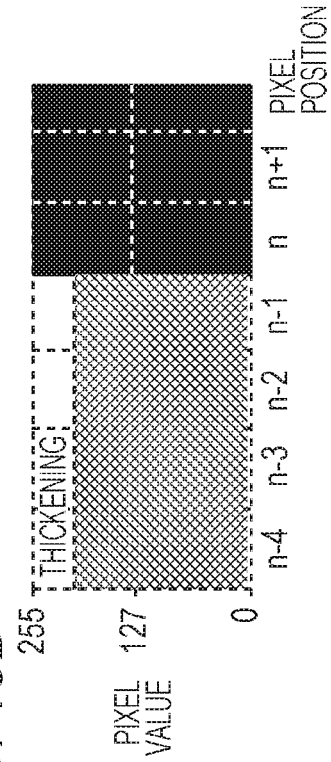

FIG. 18D is a diagram illustrating pixel values obtained when the thickening process is performed on the pixels arranged in the line illustrated in FIG. 18B. For example, each pixel value of pixels at pixel positions from n−4 to n−1 is corrected from 0 to 180. As a result, a thin line in column L−1 adjacent to the column L is thickened.

FIG. 18E is a diagram showing a correction result obtained after the pixels arranged in the line shown in FIG. 18B are subjected to a thickening process and a smoothing process according to a conventional technique. In the example shown in FIG. 18E, the correction is performed according to a rule that the processing result of the smoothing process is selected when one pixel is subjected to both the thickening process and the smoothing process. A shaded part indicates pixel values of pixels to which the thickening process is applied, and a hatched part indicates pixel values of pixels to which the smoothing process is applied.

As shown in FIGS. 18C and 18D, the pixel at the pixel position n−1 is subjected to both the thickening process and the smoothing process. As a result, as shown in FIG. 18E, an abrupt reduction occurs in the resultant pixel values between the pixel position n−2 and the pixel position n−1, and an abrupt increase occurs in the resultant pixel values between the pixel position n−1 and the pixel position n.

Figure 18F:
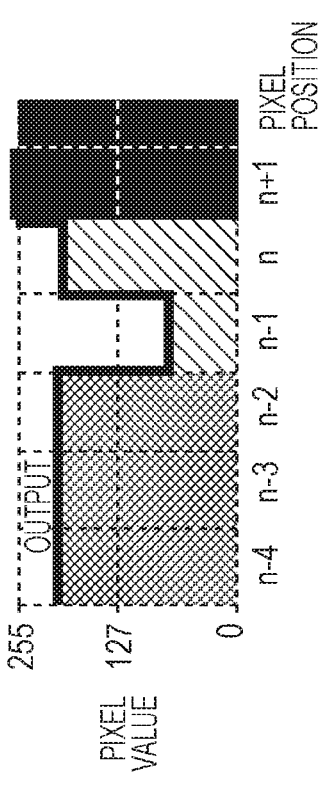

FIG. 18F shows an output image obtained when the correction processes described in FIGS. 18C to 18F are performed on each pixel of the input image shown in FIG. 18A. As a result, as shown in FIG. 18F, smoothness in density is lost at pixel positions from n−2 to n.

In this case, there is a possibility that edge smoothing is not achieved although the priority is given to reducing jaggies at an edge.

In the present embodiment, in view of at least one of the above-described concerns, a technique of image processing is disclosed which allows it to provide an image processing result with less artificialness to users. More specifically, when a smoothing process and a line width correction process are both performed on an image, a smooth edge can be obtained in a resulting image subjected to the both processes. A specific example of an image processing method for realizing the processes is described below.

Image Processing Unit

Figure 2:
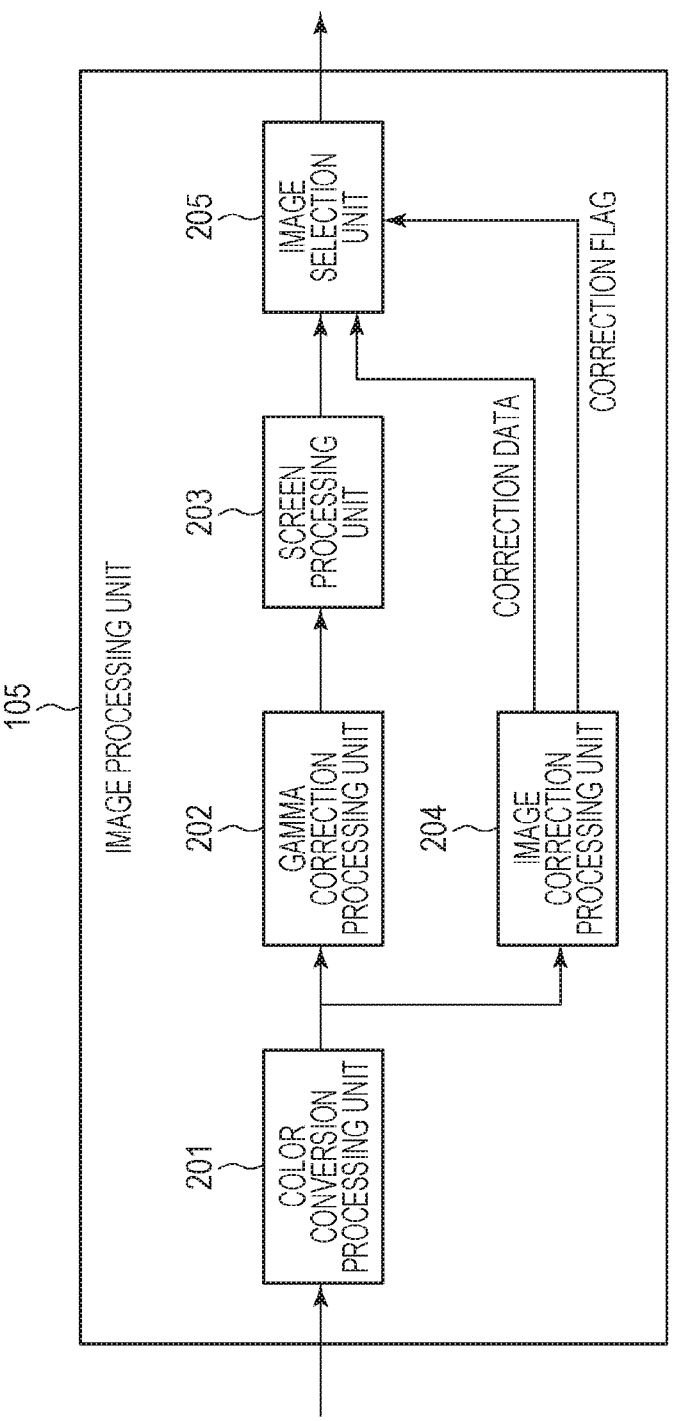
FIG. 2 is a diagram illustrating an example of a hardware configuration of an image processing unit.

Details of the image processing unit 105 are described below. As described above, the image processing unit 105 performs a rasterization process on the PDL data received via the host I/F unit 101 thereby generating RGB multi-value image data. FIG. 2 is a diagram illustrating a configuration of the image processing unit 105 configured to perform image processing for printing on the generated multi-value image data. As illustrated in FIG. 2, the image processing unit 105 includes a color conversion processing unit 201, a gamma correction processing unit 202, a screen processing unit 203, an image correction processing unit 204, and an image selection unit 205.

The color conversion processing unit 201 performs a color conversion process on multi-valued image data to convert the RGB color space to the CMYK color space. As a result of the color conversion process, CMYK image data is generated so as to have a multi density value (also referred to as gradation values or signal values) of 8 bits (256 gradations) per pixel.

The gamma correction processing unit 202 corrects input image data using a one-dimensional lookup table such that a desired density characteristic is obtained when an image is formed on a recording sheet according to the image data subjected to screen processing performed by the screen processing unit 203 (described later). In the present embodiment, the density correction is performed, by way of example, using a one-dimensional lookup table having a linear shape.

The screen processing unit 203 converts a multi-value (for example, 8-bit, 256-gradation) CMYK image received from the gamma correction processing unit 202 into a multi-value (for example, 4-bit, 16-gradation) CMYK image which is a latent image of color materials used by the print engine 22. That is, the screen processing unit performs halftone processing to convert image data having a large number of gradations into image data having a small number of gradations.

The image correction processing unit 204 receives the multi-valued CMYK image from the color conversion processing unit 201, and generates correction data by performing a smoothing process and a thin line correction process. The generated correction data is output together with a correction flag to the image selection unit 205. Details of the image processing unit 204 will be described later.

The image selection unit 205 selects either screen data received from the screen processing unit 203 or correction data received from the image correction processing unit 204 based on the correction flag received from the image correction processing unit 204, and the image selection unit 205 outputs the selected data. In a case where the correction flag is "1", it is determined that the pixel is a pixel to be subjected to the correction, and correction data is output. When the correction flag is "0", it is determined that the pixel is not a pixel to be subjected to the correction flag, and screen data is output. Thereafter, an image obtained as a result of performing an image composition process is output to the engine I/F (interface) unit 106.

Image Correction Processing Unit 204

Figure 3:
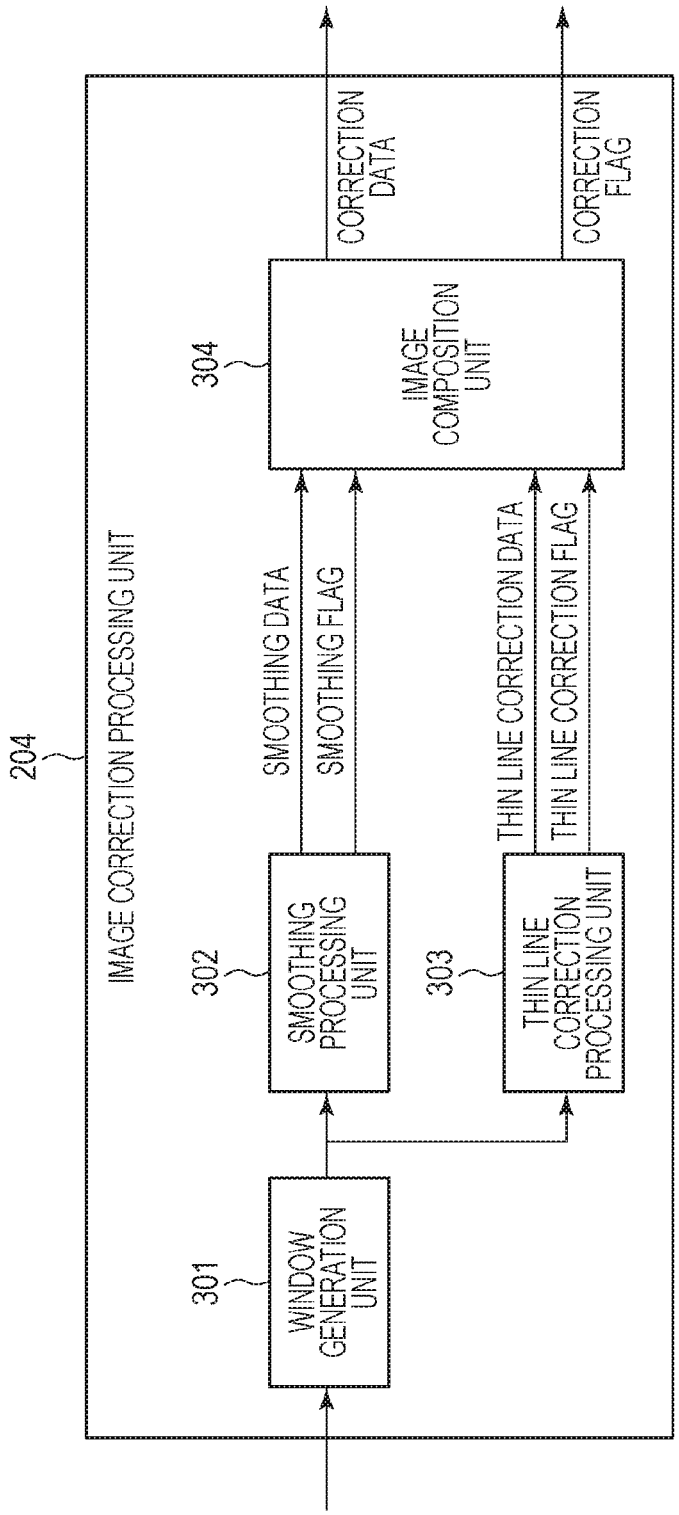
FIG. 3 is a diagram illustrating an example of a hardware configuration of an image correction processing unit.

Next, details of the image correction processing unit 204 are described below. The image correction processing unit 204 receives the multi-valued CMYK image from the color conversion processing unit 201, and generates correction data by performing a smoothing process and a thin line correction process. In a case where the pixel is a pixel to be subjected to the correction, "1" is substituted in an associated correction flag and the result is output. In a case where the pixel is not a pixel to be subjected to the correction, "0" is substituted in the associated correction flag and the result is output. FIG. 3 is a block diagram of the correction process unit 204. As illustrated in FIG. 3, the image processing unit 204 includes a window generation unit 301, a smoothing processing unit 302, a thin line correction processing unit 303, and an image composition unit 304. FIG. 4 is a diagram for explaining a 7×7 pixel window generated by the window generation unit 301. The pixel of interest is a pixel [33].

First, image data converted into the CMYK color space is stored in a FIFO memory in the window generation unit 301. The FIFO memory delays the image data by 6 lines and forms a window having a width of 7 pixels and a height of 7 pixels in the center of which the pixel of interest is located. In the smoothing process, pattern matching with an edge pattern including of 3×3 pixels is performed, and thus, 3×3 pixels surrounding the pixel [33] and including the pixel [33] of interest itself are selected and output to the smoothing processing unit 302. In the thin line correction process, pattern matching with a thin line pattern including of 7×7 pixels is performed and thus 7×7 pixels are output to the thin line correction processing unit 303.

The smoothing processing unit 302 generates a judgment image including 3×3 pixels from the 3×3 pixels including the pixel of interest [33], and performs an edge pattern judgment process on the pixel of interest. The 3×3 pixel judgment image is compared with an edge pattern prepared in advance. In a case where it is determined as a result of the comparison that the pixel of interest is a pixel to be subjected to the smoothing process, "1" is substituted in a smoothing flag associated with the pixel of interest and is output. In the case where it is determined that the pixel of interest is to be subjected to the smoothing process, smoothing data for the pixel of interest is calculated and is output. Details of the smoothing process will be described later.

The thin line correction processing unit 303 generates 7×7 pixel judgment image from the 7×7 pixels including the pixel of interest and performs the thin line pattern judgment process using the generated 7×7 pixel judgment image. The 7×7 pixel judgment image is compared with a thin line pattern prepared in advance to determine whether the pixel of interest is a pixel to be subjected to the thin line correction process. In a case where it is determined that the pixel of interest is a pixel to be subjected to the thin line correction process, a predetermined value is substituted in a thin line correction flag associated with the pixel of interest and is output. Furthermore, in the case where it is determined that the pixel of interest is to be subjected to the thin line correction process, thin line correction data for correcting the pixel of interest is calculated and is output. Details of the thin line correction process will be described later.

The image composition unit 304 receives the smoothing data and the smoothing flag from the smoothing processing unit 302, and receives the thin line correction data and the thin line correction flag from the thin line correction processing 303, and the image composition unit 304 performs an image composition process. Thereafter, the image composition unit 304 generates a correction flag based on the smoothing flag and the thin line correction flag, and outputs the resultant correction flag. Furthermore, correction data is calculated based on the smoothing data, the smoothing flag, the thin line correction data, and the thin line correction flag, and the resultant correction data is output. Details of the image composition processing performed by the image composition unit 304 will be described later. The generated correction data and the correction flag are output to the image selection unit 205.

Smoothing Processing Unit 302

Figure 5:
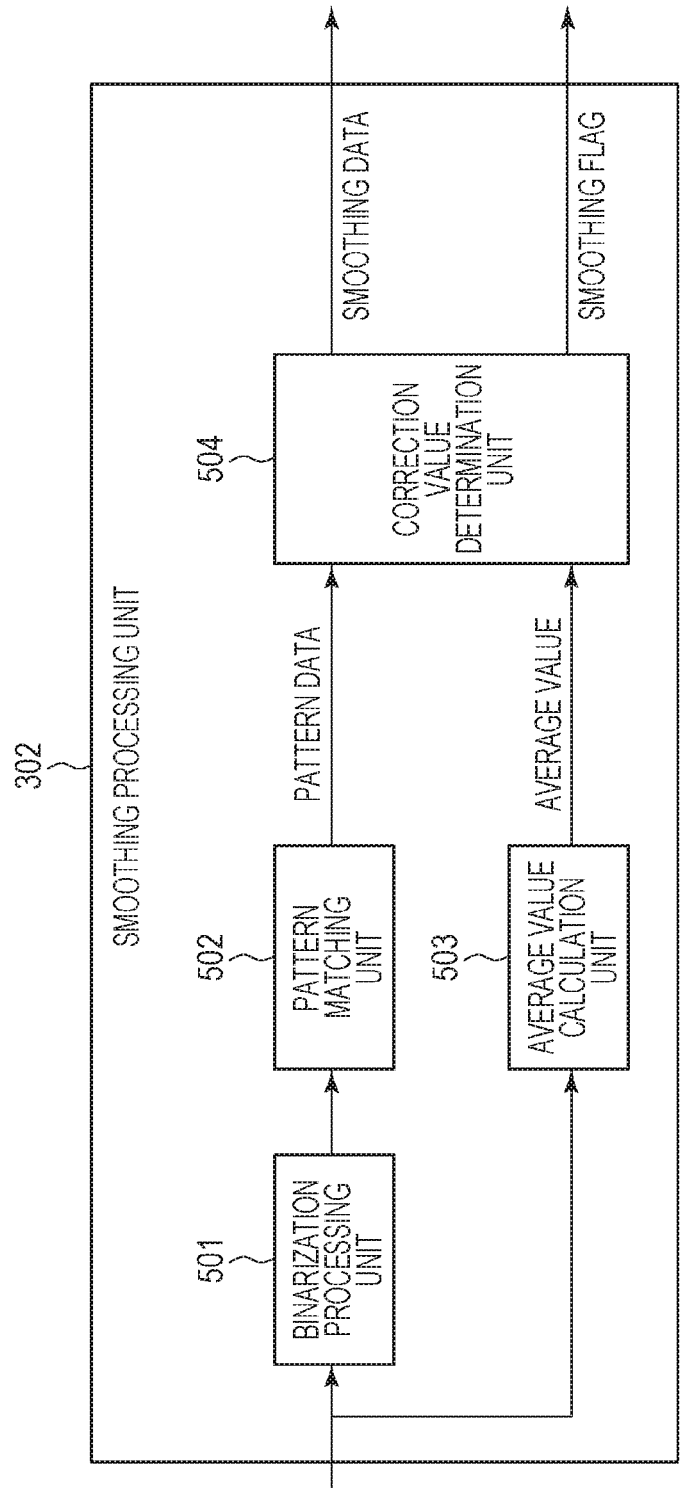
FIG. 5 is a diagram illustrating an example of a hardware configuration of a smoothing processing unit.
Figure 6:
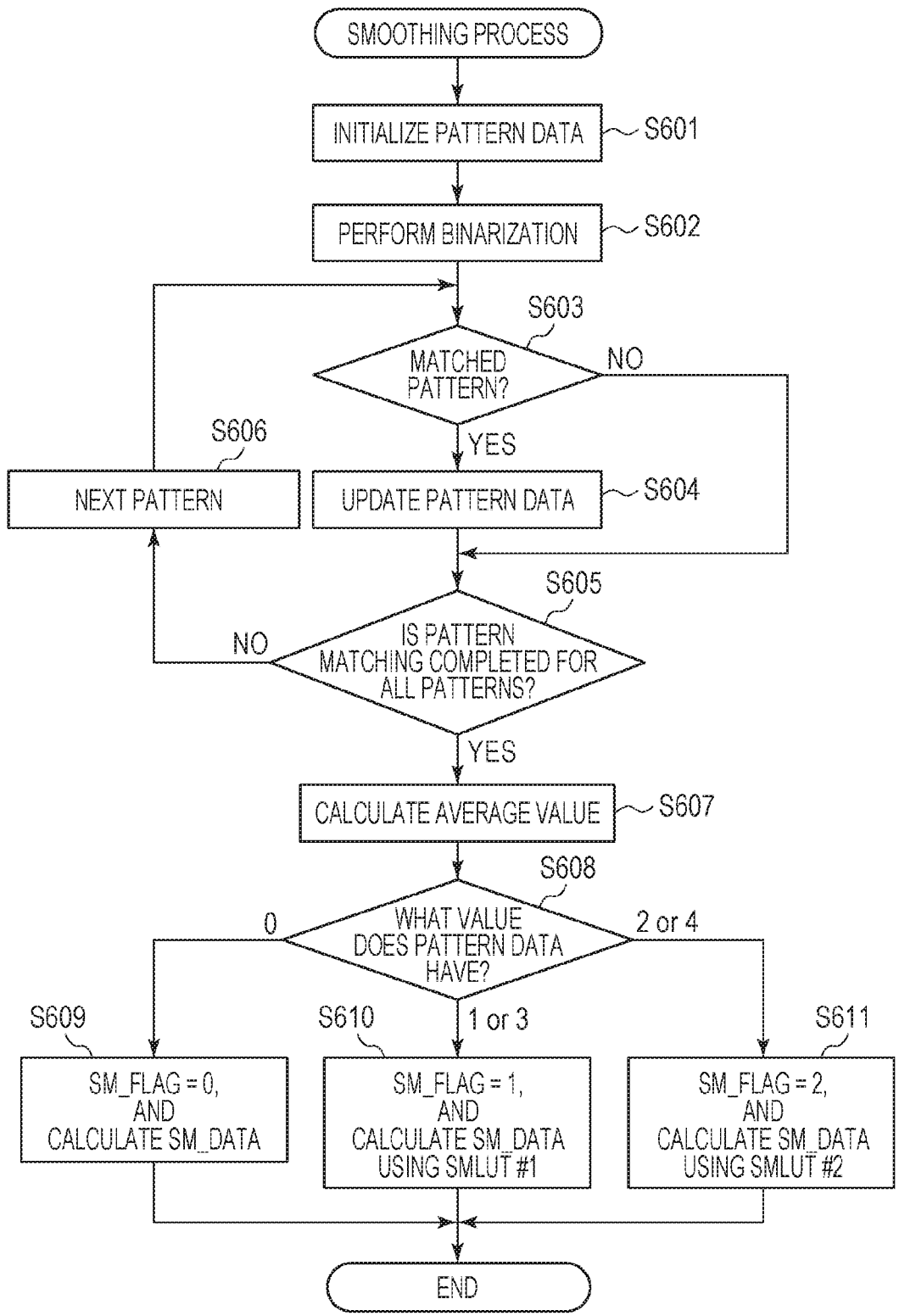
FIG. 6 is a flow chart illustrating an example of a process performed by a smoothing processing unit.
Figure 7:
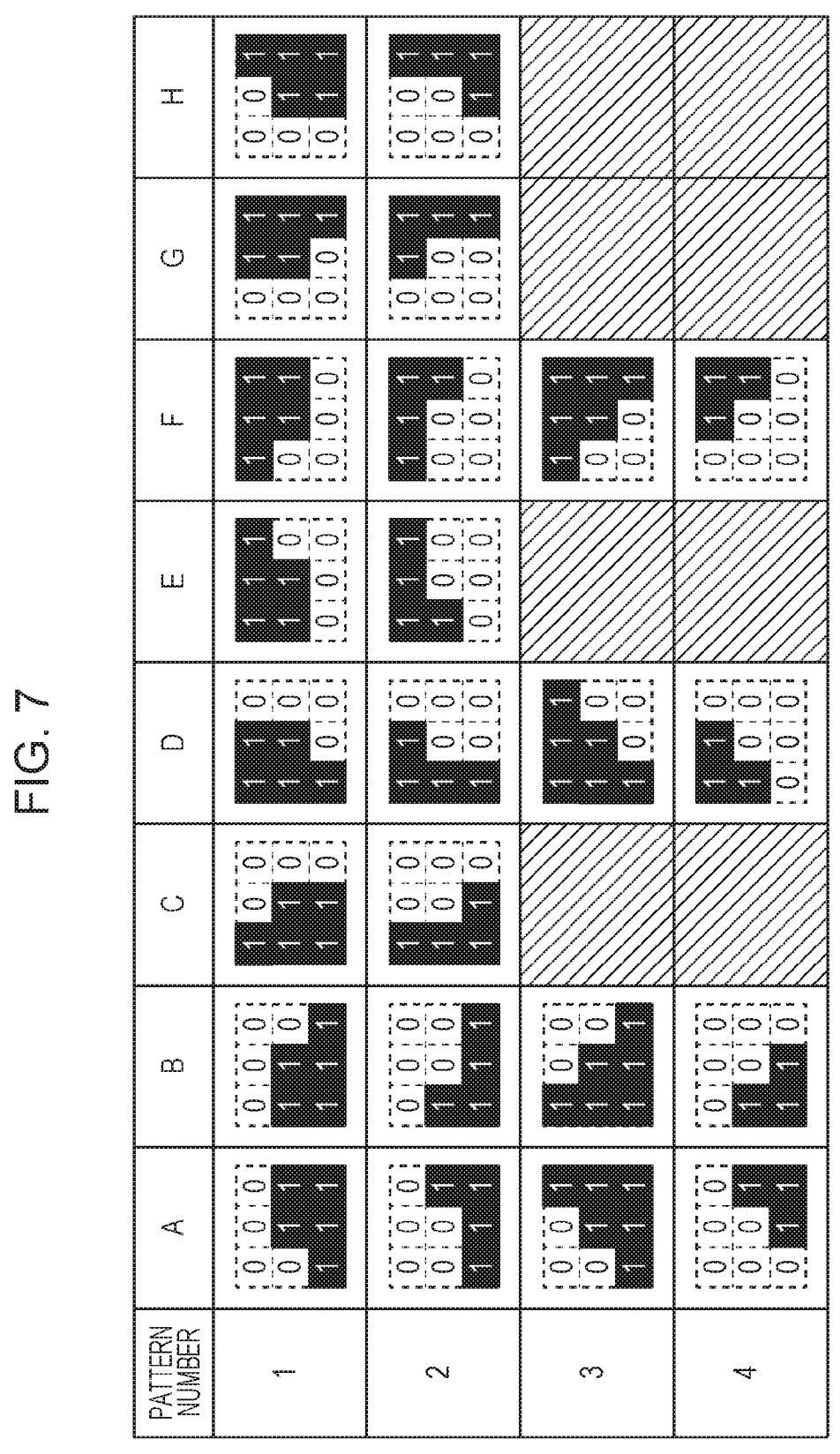
Figure 8A:
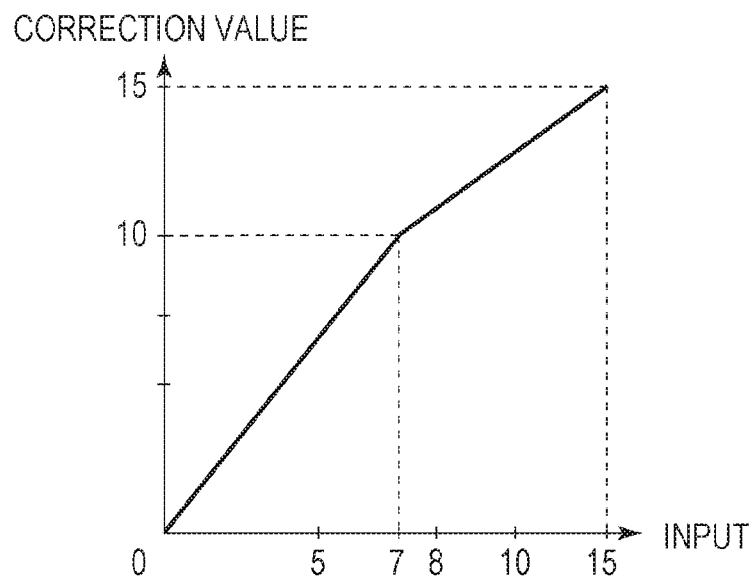
FIGS. 8A and 8B each illustrate by way of example characteristics of a lookup table used in edge correction.
Figure 8B:
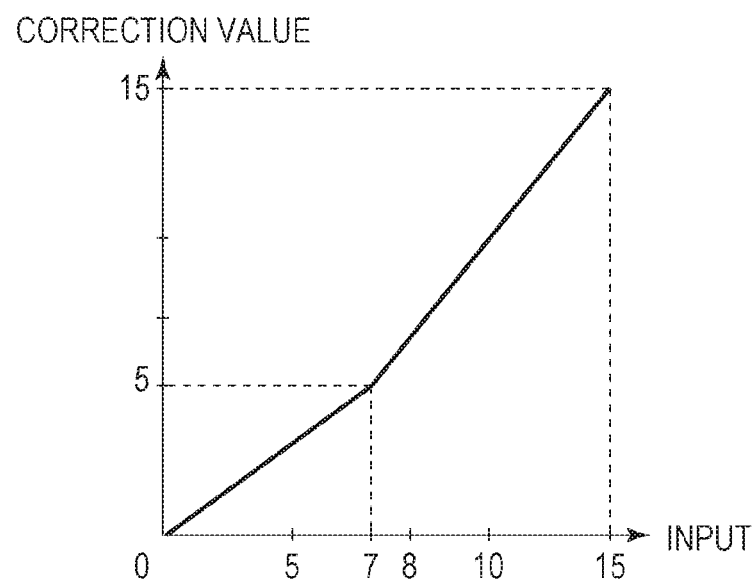

Next, the smoothing process performed by the smoothing processing unit 302 according to the present embodiment is described in further detail below. FIG. 5 is a diagram illustrating a configuration of the smoothing processing unit 302. FIG. 6 is a flow chart illustrating a smoothing process according to the present embodiment. FIG. 7 illustrates examples of edge patterns according to the present embodiment. FIGS. 8A and 8B illustrate examples of characteristics of lookup tables used in the smoothing process according to the present embodiment. FIG. 8A illustrates an example of a characteristic of a lookup table SMLUT #1 used for a pattern of a pattern number 1 or 3 shown in FIG. 7. FIG. 8B illustrates an example of a characteristic of a lookup table SMLUT #2 used for a pattern of a pattern number 2 or 4 shown in FIG. 7. FIG. 14 is a diagram for explaining a processing result according to the present embodiment.

FIG. 14A illustrates an example of an input image applied to the image correction processing unit 204, and FIG. 14B illustrates an example of an output result given by the screen processing unit 203. FIG. 14C illustrates an example of a processing result given by the binarization processing unit 501, and FIG. 14D illustrates an example of a smoothing flag output from the smoothing processing unit 302. FIG. 14E illustrates an example of smoothing data output from the smoothing processing unit 302, and FIG. 14F illustrates an example of a processing result given by the thin line binarization processing unit 901. FIG. 14G illustrates an example of a thin line correction flag output from the thin line correction processing unit 303 described later, and FIG. 14H illustrates an example of thin line correction data output from the thin line correction processing unit 303 described later. FIG. 14I illustrates an example of a correction flag output from the image composition unit 304, and FIG. 14J illustrates an example of correction data provided not according to the present embodiment but according to a conventional method. FIG. 14K illustrates an example of correction data output from the image composition unit 304 according to the present embodiment.

An outline of a process performed in each block of the smoothing processing unit 302 is described with reference to the block diagram of FIG. 5. The binarization processing unit 501 receives an 8-bit image of 3×3 pixels, compares each pixel value with a predetermined threshold value, generates a judgment image, and outputs the resultant judgment image to the pattern matching unit 502. This generated judgment image is used by the pattern matching unit 502 in performing pattern matching.

The pattern matching unit 502 compares the judgment image with the edge pattern. If they match, then a pattern number of the matched pattern is substituted in pattern data and is output.

In order to perform the smoothing process, the average value calculation unit 503 receives 3×3 pixels centered on the pixel of interest and calculates and outputs an average value of 3×3 pixels.

The correction value determination unit 504 calculates and outputs smoothing data and a smoothing flag based on the pattern data and the average value input from the pattern matching unit 502.

The operation of the smoothing processing unit 302 is described in further detail below with reference to a flow chart shown in FIG. 6. The flow chart shown in FIG. 6 shows control executed by the smoothing processing unit 302 realized by a hardware circuit such as an ASIC. In the present embodiment, it is assumed by way of example that the process described in the flow chart shown in FIG. 6 is performed by a hardware circuit. However, the method of performing the process is not limited to that using the hardware circuit. For example, in an alternative implementation, a processor may read a program for image processing and may perform image processing on an input image.

First, in step S601, the pattern matching unit 502 initializes pattern data by substituting "0" into the pattern data.

Next, in step S602, the binarization processing unit 501 receives an image from the window generation unit 301 and generates a judgment image from 3×3 pixels. The binarization processing unit 501 compares a pixel value of each of the 3×3 pixels with a predetermined threshold value (127 in the present embodiment), and outputs "1" when the pixel value is larger than the threshold value but otherwise outputs "0". The resultant judgment image is output to the pattern matching unit 502. For example, in a case where 3×3 pixels 1402 shown in FIG. 14A are input to the binarization processing unit 501, pixels having a pixel value "0" are determined to be smaller than the threshold value 127, and thus "0" is output for those pixels, while "1" is output for pixels having a pixel value of "255". As a result, 3×3 pixels 1403 shown in FIG. 14C are obtained as a judgment image.

In steps S603 to S606, the pattern matching unit 502 compares the judgment image received from the binarization processing unit 501 with edge patterns. If there is an edge pattern that matches the judgment image, pattern data is output.

In step S603, the pattern matching unit 502 compares the judgment image (3×3 pixels) received from the binarization processing unit 501 with the edge pattern individually for each pixel (of 9 pixels in total) at the corresponding pixel position. If all nine pixels match, the process proceeds to step S604, but if any pixel does not match, the process proceeds to step S605. For example, in a case where the 3×3 pixels 1403 in FIG. 14C are input as a judgment image, a determination is first performed whether or not the judgment image matches an edge pattern A with a pattern number 1. In the case of the 3×3 pixels 1403, at least one pixel does not match the edge pattern A with the pattern number 1, and thus, the process proceeds to step S605.

In step S604, the pattern matching unit 502 determines that all pixels of the judgment image and all pixels of the edge pattern match, and updates the pattern data by substituting, in the pattern data, the pattern number that matches the judgment image. For example, in the case where the 3×3 pixels 1403 in FIG. 14C are input as a judgment image, this judgment image matches an edge pattern A with a pattern number 2, and thus the pattern data is updated in step S604 by substituting 2 of the pattern number into the pattern data. As a result, the pattern data of the pixel of interest in the 3×3 pixels 1403 is "2".

In step S605, the pattern matching unit 502 determines whether the comparison is completed for all edge patterns. In a case where the comparison is completed for all edge patterns, the process proceeds to step S607. In a case where the comparison is not completed for all edge patterns, the process proceeds to step S606.

In step S606, the pattern matching unit 502 selects a next edge pattern to be used in comparison, and executes steps S603 to S605. FIG. 7 illustrates examples of edge patterns. The pattern matching unit 502 performs pattern matching using an edge pattern sequentially selected from edge patterns of pattern number of 1 in the order from A, B, C, D, E, F, G, and H. After the edge pattern H of pattern number 1 is completed, the pattern matching is further performed using an edge pattern sequentially selected from edge patterns of pattern number of 2 in the order from A, B, C, D, E, F, G, and H. In this manner, the pattern matching is performed until an edge pattern F of pattern number of 4 is completed. When the pattern matching is completed for F of pattern number 4, the pattern matching unit 502 determines in step S605 that the pattern matching has been performed for all patterns, and thus the process proceeds to step S607.

In step S607, the average value calculation unit 503 calculates the average value of the input 3×3 pixels. The average value calculation unit 503 determines an 8-bit average value AVE from 9 pixels having a width of 3 pixels and a height of 3 pixels centered on the pixel of interest in the input reference area.

However, in the present embodiment, to determine the average value without performing a division operation, the average value is given by a result of a bit operation according to equation (1).

$$AVE=(SUM>>3) \quad (1)$$

In equation (1), ">>" denotes a bit operation of shifting a value described on the left side of operation symbol ">>" to the right by a number of bits described on the right side of the operation symbol ">>". That is, by shifting the sum of the pixel values of 9 pixels to the right by 3 bits (dividing by 8), the 8-bit average value AVE is obtained without performing a division operation. Note that the average value may be determined by dividing the sum of the pixel values of 9 pixels by 9. For example, when the 3×3 pixels 1402 shown in FIG. 14A are input, the average value AVE is calculated as 127 according to equation (2).

$$AVE=(1020>>3)=127 \quad (2)$$

In steps S608 to S611, the correction value determination unit 504 receives the pattern data from the pattern matching unit 502 and the average value AVE from the average value calculation unit. Then, smoothing data is calculated while referring to a one-dimensional lookup table SMLUT, and the smoothing data and a smoothing flag are output. The SMLUT is an 8-bit input and 4-bit output lookup table, and is set to have a non-linear characteristic depending on the characteristic of the printer. In the present embodiment, a plurality of SMLUTs are provided, and the SMLUT used is switched depending on the edge pattern. FIG. 8 illustrates an example of a characteristic of SMLUT according to the present embodiment. A lookup table SMLUT #1 whose characteristic is illustrated in FIG. 8A is a lookup table for pattern numbers 1 and 3. A lookup table SMLUT #2 whose characteristic is illustrated in FIG. 8B is a lookup table for pattern numbers 2 and 4.

In step S608, the correction value determination unit 504 judges pattern data. In a case where the pattern data is 0, it is determined that there is no edge pattern that matches the judgment image, and the process proceeds to step S609. In a case where the pattern data is 1 or 3, the process proceeds to step S610. In a case where the pattern data is 2 or 4, the process proceeds to step S611.

In step S609, the correction value determination unit 504 determines that there is no edge pattern that matches the judgment image, and substitutes "0" in the smoothing flag SM_FLAG. Then, the upper 4 bits of the pixel value of the pixel of interest are output as smoothing data SM_DATA, and the process is ended. For example, in a case where the pixel value of the pixel of interest is 255 (8 bits), upper 4 bits of "15" are output as the smoothing data SM_DATA.

In step S610, the correction value determination unit 504 determines that the pixel of interest matches a black pattern, and refers to a one-dimensional lookup table SMLUT #1 that is to be referred to when the pixel of interest is black, and calculates SM_DATA. The correction value determination unit 504 modulates the average value AVE with a one-dimensional lookup table SMLUT #1, and outputs the modulated value as smoothing data SM_DATA. The correction value determination unit 504 substitutes "1" in the smoothing flag SM_FLAG and ends the process.

In step S611, the correction value determination unit 504 determines that the pixel of interest matches a white pattern, and refers to a one-dimensional lookup table SMLUT #2 that is to be referred to when the pixel of interest is white, and calculates SM_DATA. The correction value determination unit 504 modulates the average value AVE with a one-dimensional lookup table SMLUT #2, and outputs the modulated value as smoothing data SM_DATA. The correction value determination unit 504 substitutes "1" in the smoothing flag SM_FLAG and ends the process. For example, in the case where the 3×3 pixels 1403 shown in FIG. 14C are input as a judgment image, the pattern data is "2", and thus "1" is substituted in the smoothing flag SM_FLAG and is output as indicated by 1404 in FIG. 14D. Since the average value is 127, the correction value "5" is obtained by referring to the one-dimensional lookup table SMLUT #2 in FIG. 9B. Thus, as with a pixel 1405 shown in FIG. 14E, "5" is output as smoothing data.

By applying the smoothing process as described above, the edge pixels are smoothed as shown in FIG. 14E. In the present embodiment described above, it is assumed by way of example that the processes in S603 to S606 are performed repeatedly using the single pattern matching circuit, but the present embodiment is not limited to this example. For example, a plurality of pattern matching circuits may be provided and the processes may be performed in parallel.

The edge smoothing method is not limited to that described above, but various edge smoothing methods may be applied. For example, edge smoothing may be performed using a neural network having parameters obtained via learning.

Detailed Description of Thin Line Correction Processing Unit 303

Figure 10:
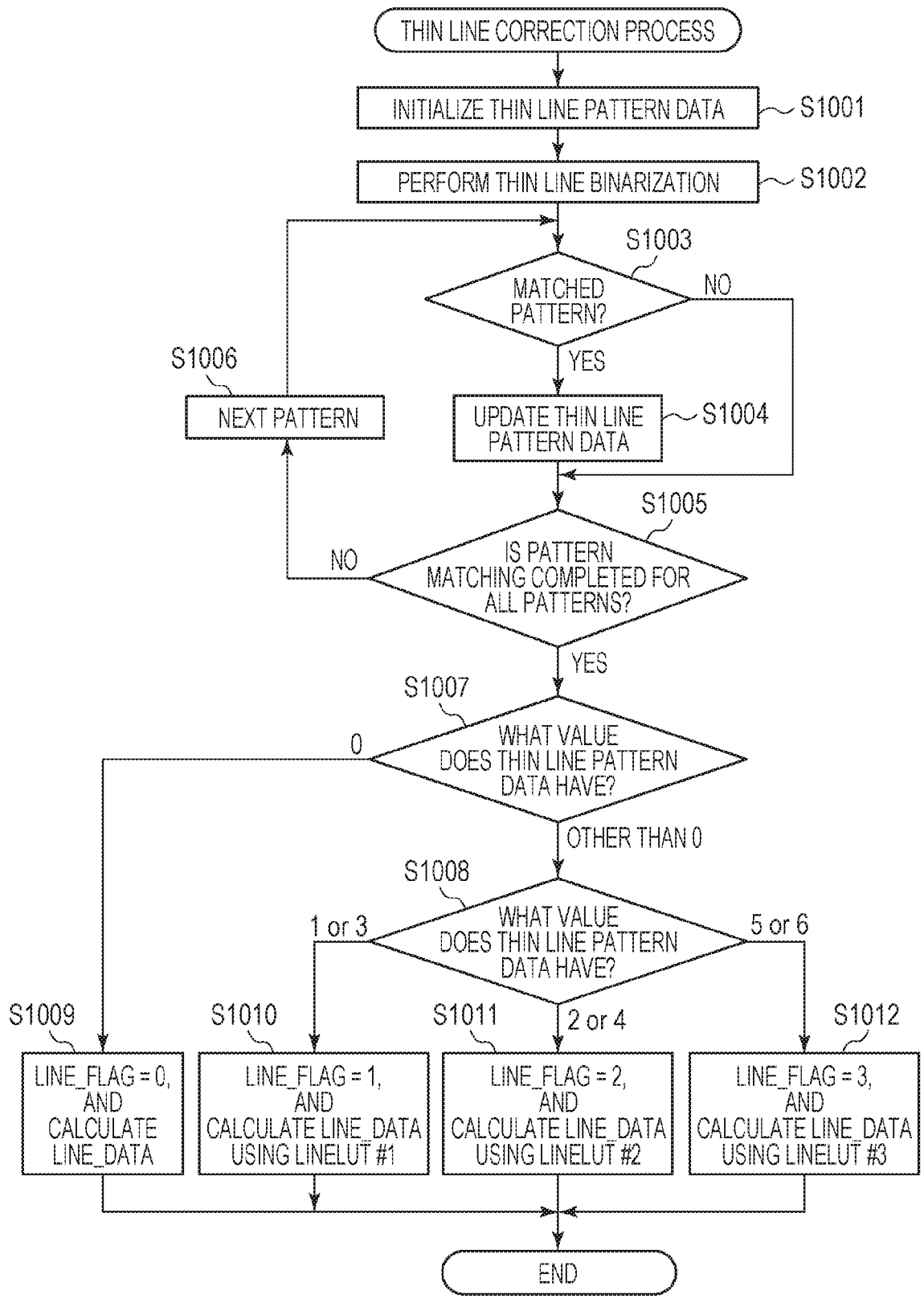
FIG. 10 is a flow chart illustrating an example of a process performed by a thin line correction processing unit.
Figure 11:
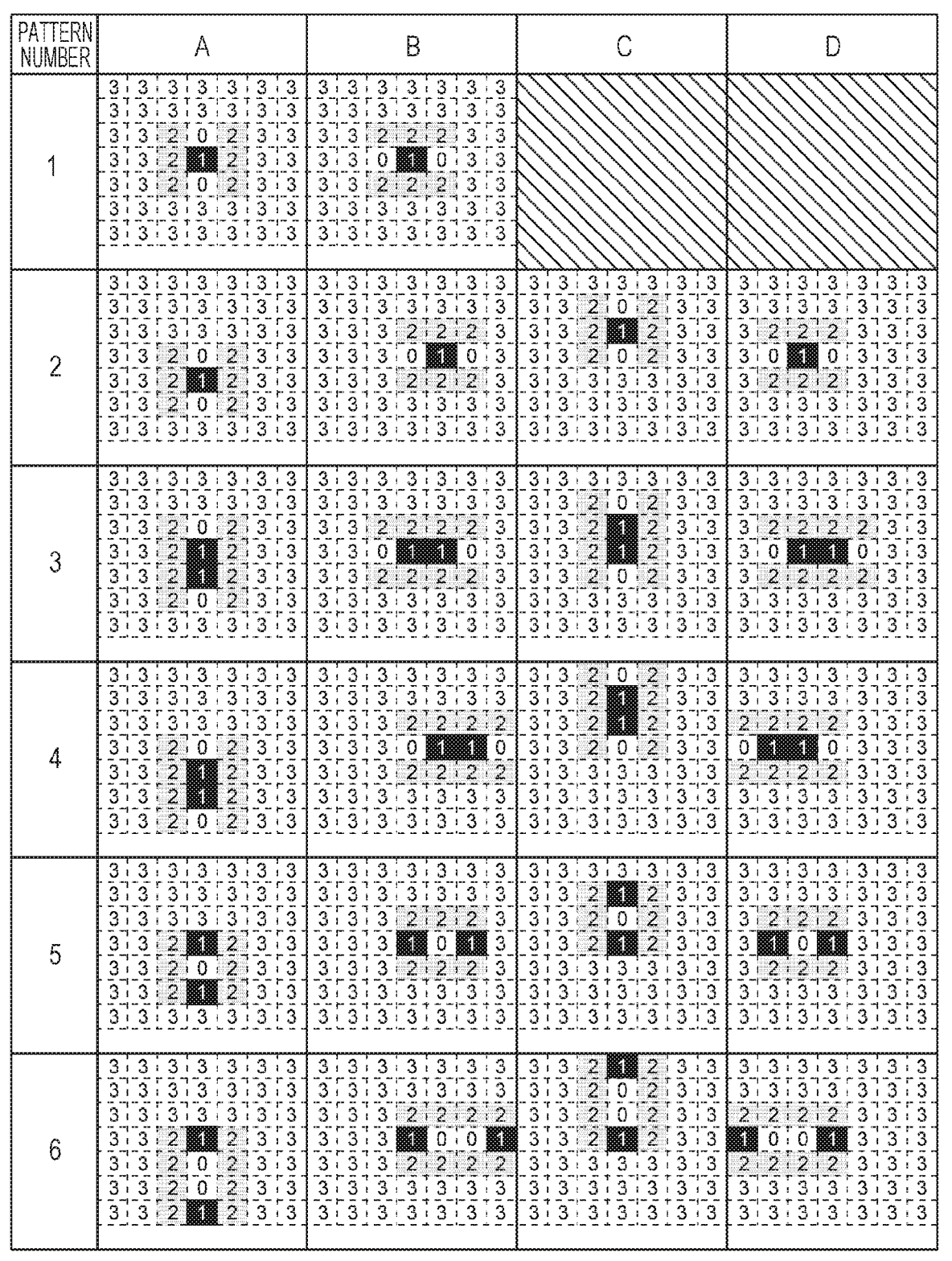
Figure 12:
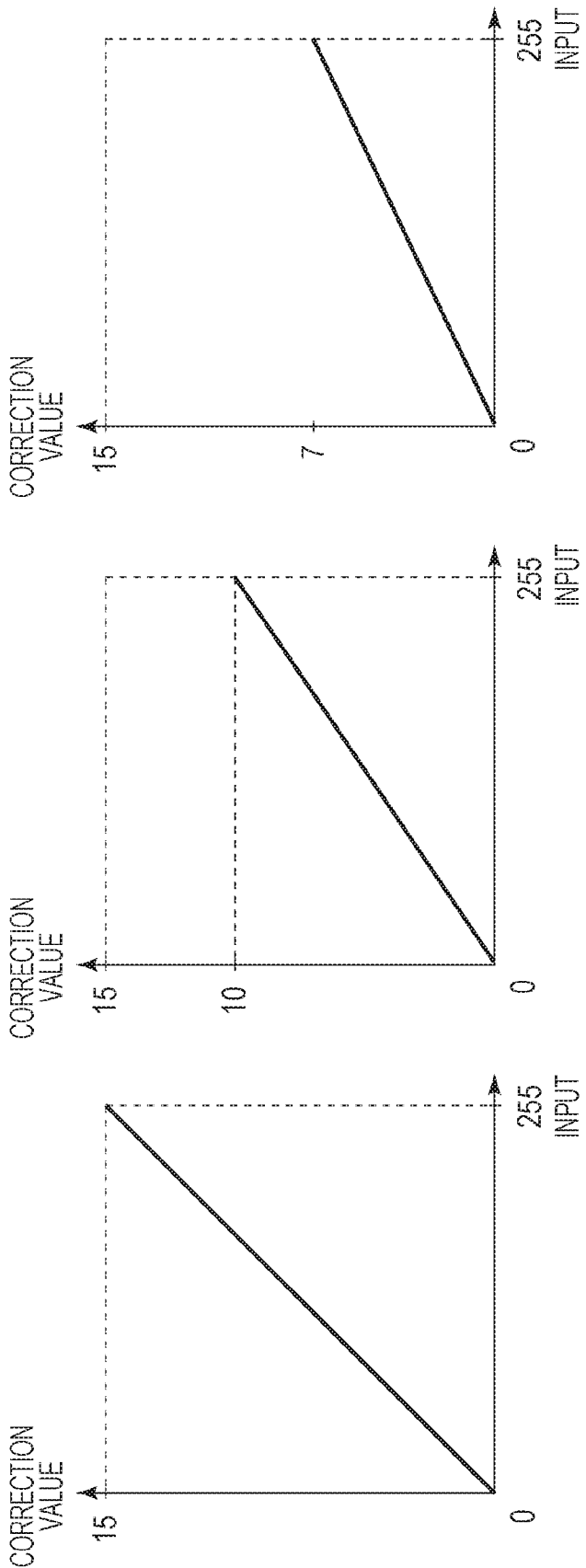
FIGS. 12A, 12B, and 12C each illustrate an example of a characteristic of a lookup table used in thin line correction.

Next, the thin line correction process performed by the thin line correction processing unit 303 according to the present embodiment is described in further detail below. FIG. 9 is a block diagram of the thin line correction processing unit 303. FIG. 10 is a flow chart illustrating a thin line correction process according to the present embodiment. FIG. 11 illustrates examples of thin line patterns according to the present embodiment. FIGS. 12A to 12C show examples of characteristics of lookup tables used in the thin line correction process according to the present embodiment. FIG. 12A shows an example of a characteristic of a lookup table LNLUT #1 used when a pattern of pattern number 1 or 3 shown in FIG. 11 is matched. FIG. 12B shows an example of a characteristic of a lookup table LNLUT #2 used when a pattern of pattern number 2 or 4 shown in FIG. 11 is matched. FIG. 12C shows an example of a characteristic of a lookup table LNLUT #3 used when a pattern of pattern number 5 or 6 shown in FIG. 11 is matched.

An outline of a process performed by each block in the thin line correction processing unit 303 is described below with reference to the block diagram shown in FIG. 9. The thin line binarization processing unit 901 receives an 8-bit image of 7×7 pixels, compares each pixel value with a predetermined threshold value, generates a judgment image, and outputs the resultant judgment image to the pattern matching unit 902. The generated judgment image is used in performing pattern matching by the thin line pattern matching unit 902.

The thin line pattern matching unit 902 compares the judgment image with a thin line pattern. In a case where the judgment image matches the thin line pattern, a pattern number of the thin line pattern that matches the judgment image is substituted in thin line pattern data, and the resultant thin line pattern data is output.

The thin line correction value determination unit 903 calculates the thin line correction data and the thin line correction flag based on the thin line pattern data input from the thin line pattern matching unit 902 and pixel values of 3×3 pixels centered on the pixel of interest, and the thin line correction value determination unit 903 outputs the result.

The operation of the thin line correction processing unit 303 is described in detail below with reference to the flow chart shown in FIG. 10. The flow chart shown in FIG. 10 is a flow chart for explaining control executed by the processing unit 303 realized by a hardware circuit such as an ASIC. In the present embodiment, it is assumed by way of example that the process described in the flow chart shown in FIG. 10 is performed by a hardware circuit. However, the method of performing the process is not limited to that using the hardware circuit. For example, in an alternative implementation, a processor may read a program for image processing and may perform image processing on an input image.

First, in step S1001, the thin line pattern matching unit 902 initializes the thin line pattern data by substituting "0" into the thin line pattern data.

Next, in step S1002, the thin line binarization processing unit 901 receives an image from the window generation unit 301 and generates a judgment image from 7×7 pixels. The thin line binarization processing unit 901 compares a pixel value of each of the 7×7 pixels with a predetermined threshold value (127 in the present embodiment), and outputs "1" when the pixel value is larger than the threshold value but otherwise outputs "0". The resultant judgment image is output to the pattern matching unit 902. For example, in a case where 7×7 pixels 1406 shown in FIG. 14A are input to the thin line binarization processing unit 901, pixels having a pixel value "0" are determined to be smaller than the threshold value 127, and thus "0" is output for those pixels, while "1" is output for pixels having a pixel value of "255". As a result, 7×7 pixels 1407 shown in FIG. 14F are obtained as a judgment image.

In steps S1003 to S1006, the thin line pattern matching unit 902 compares thin line patterns with the judgment image received from the thin line binarization processing unit 901. If there is a thin line pattern that matches the judgment image, thin line pattern data is output.

More specifically, in step S1003, the thin line pattern matching unit 902 makes a comparison between the judgment image (7×7 pixels) received from the thin line binarization processing unit 901 and a thin line pattern (7×7 pixels) (total 49 pixels) individually for each corresponding pixel location. The comparison process is described in further detail below with reference to FIG. 11 illustrating examples of thin line patterns. When a comparison is performed for a pixel marked "0" in a pattern shown in FIG. 11, a determination is performed as to whether a pixel value of a corresponding pixel of a judgment image is "0" or not. In a case where the pixel value is "0", it is determined that the pattern matches. When a comparison is performed for a pixel marked "1" in a pattern shown in FIG. 11, a determination is performed as to whether a pixel value of a corresponding pixel of a judgment image is "1" or not. In a case where the pixel value is "1", it is determined that the pattern matches. When a comparison is performed for a pixel marked "2" in a pattern shown in FIG. 11, a determination is performed as to whether a pixel value is "1" for least one or more pixels in a judgment image. In a case where the pixel value is "1" for at least one or more pixels, it is determined that the pattern matches. When a comparison is performed for a pixel marked "3" in a pattern shown in FIG. 11, it is determined that the pattern matches regardless of the pixel value of a judgment image.

In a case where all the above judgment conditions are satisfied, the process proceeds to step S1004, but otherwise the process proceeds to step S1005. For example, in a case where the 7×7 pixel 1407 shown in FIG. 14F is given as a judgment image, a determination is first performed as to whether the judgment image matches a pattern A of pattern number 1. The 7×7 pixels 1407 do not match the pattern A of the pattern number 1, and thus the process proceeds to step S1005.

In step S1004, the thin line pattern matching unit 902 determines that the judgment image matches the thin line pattern, and updates the thin line pattern data by substituting the matched pattern number into the thin line pattern data.

In step S1005, the thin line pattern matching unit 902 determines whether the comparison has been performed for all the thin line patterns. In a case where the comparison is completed for all thin line patterns, the process proceeds to step S1007. However, in a case where the comparison is not completed for all thin line patterns, the process proceeds to step S1006.

In step S1006, the thin line pattern matching unit 902 selects a next thin line pattern to be subjected to the comparison, and executes steps S1003 to S1005. For example, when 7×7 pixels 1407 shown in FIG. 14F are given as a judgment image and are compared, for example, with a thin line pattern A of a pattern number of 4, the comparison is performed to check whether the following judgment conditions are satisfied: a pixel [33] and a pixel [36] are "0"; a pixel [34] and a pixel [35] are "1"; and a pixel value is "1" for at least one of a pixel [23], a pixel [24], a pixel [25], a pixel [26], a pixel [43], a pixel [44], a pixel [45], and a pixel [46]. In the 7×7 pixels 1407, the pixel [33] and the pixel [36] are "0", the pixel [34] and the pixel [35] are "1", and the pixel [24], the pixel [25], the pixel [43], the pixel [44], and the pixel [45] are "1", and thus all the above conditions are satisfied. Therefore, when the 7×7 pixels 1407 shown in FIG. 14F are given as the judgment image, the judgment image matches the pattern A of the pattern number 4. In step S1004, the thin line pattern matching unit 902 updates the thin line pattern data by substituting "4" of the pattern number into the thin line pattern data. Thus, the thin line pattern data associated with the pixel of interest in the 7×7 pixels 1407 is given as "4". The thin line pattern matching unit 902 performs pattern matching sequentially with patterns A and B of the pattern number 1 in the order from A to B. After the pattern B of the pattern number 1 is checked, pattern matching is performed for the pattern A of the pattern number 2. Then, the pattern matching is performed for patterns B, C, and D of the pattern number 2 sequentially in this order and furthermore for other patterns in a similar manner until the pattern matching for the pattern D of the pattern number 6 is completed. When the pattern matching for the pattern D of the pattern number 6 is completed, then in step S1005, the thin line pattern matching unit 902 determines that the pattern matching is completed for all patterns, and thus the process proceeds to step S1007.

In steps S1007 to S1012, the thin line correction value determination unit 903 receives the thin line pattern data from the thin line pattern matching unit 902 and pixel values of 3×3 pixels centered on the pixel of interest from the window generation unit 301. Then, thin line correction data is calculated while referring to the one-dimensional lookup table LNLUT, and the thin line correction data and a thin line correction flag are output. The LNLUT is an 8-bit input and 4-bit output lookup table, and is set to have a non-linear output characteristic depending on the characteristic of the printer. In the present embodiment, a plurality of LNLUTs are prepared, and a corresponding LNLUT is selected depending on the thin line pattern. FIGS. 12A to 12C illustrate examples of characteristics of LNLUTs according to the present embodiment. A lookup table LNLUT #1 whose characteristic is illustrated in FIG. 12A is a lookup table for pattern numbers 1 and 3. A lookup table LNLUT #2 whose characteristic is illustrated in FIG. 12B is a lookup table for pattern numbers 2 and 4. A lookup table LNLUT #3 whose characteristic is illustrated in FIG. 12C is a lookup table for pattern numbers 5 and 6.

In step S1007, the thin line correction value determination unit 903 judges the thin line pattern data. In a case where the thin line pattern data is 0, it is determined that there is no thin line pattern that matches the judgment image, and the process proceeds to step S1009. In a case where the thin line pattern data is other than 0, the process proceeds to step S1008.

In step S1008, the thin line correction value determination unit 903 judges the thin line pattern data. In a case where the thin line pattern data is 1 or 3, the process proceeds to step S1010. In a case where the thin line pattern data is 2 or 4, the process proceeds to step S1011. In a case where the thin line pattern data is 5 or 6, the process proceeds to step S1012.

In step S1009, the thin line correction value determination unit 903 determines that there is no thin line pattern that matches the judgment image, and the thin line correction value determination unit 903 substitutes "0" in the thin line correction flag LN_FLAG. Then, the upper 4 bits of the pixel value of the pixel of interest are output as the thin line correction data LN_DATA, and the process is ended. For example, when the pixel value of the pixel of interest is 255 (8 bits), the upper 4 bits "15" are output as the thin line correction data LN_DATA.

In step S1010, the thin line correction value determination unit 903 determines that the pixel of interest is a thin line pixel, and calculates LN_DATA by referring to the one-dimensional lookup table LNLUT #1 that is a lookup table to be referred to when the pixel of interest is a thin line pixel. The thin line correction value determination unit 903 modulates the pixel value of the pixel of interest with the one-dimensional lookup table LNLUT #1 and outputs the modulated value as the thin line correction data LN_DATA. The thin line correction value determination unit 903 substitutes "1" in the thin line correction flag LN_FLAG, and ends the process.

In step S1011, the thin line correction value determination unit 903 determines that the pixel of interest is a pixel adjacent to a thin line, and calculates LN_DATA by referring to a one-dimensional lookup table LNLUT #2 that is a lookup table to be referred to when the pixel of interest is a pixel adjacent to a thin line. The thin line correction value determination unit 903 modulates a pixel value of an adjacent thin line with the one-dimensional lookup table LNLUT #2, and outputs the modulated value as the thin line correction data LN_DATA. In a case where the thin line pattern is a pattern A of pattern number 2, the pixel value of the pixel [34] is modulated by LNLUT #2. In a case where the thin line pattern is a pattern B of pattern number 2, the pixel value of the pixel [43] is modulated by LNLUT #2. In a case where the thin line pattern is a pattern C of pattern number 2, the pixel value of the pixel [32] is modulated by LNLUT #2. In a case where the thin line pattern is a pattern D of pattern number 2, the pixel value of the pixel [23] is modulated by LNLUT #2. In a case where the thin line pattern is a pattern A of pattern number 4, the pixel value of the pixel [34] is modulated by LNLUT #2. In a case where the thin line pattern is a pattern B of pattern number 4, the pixel value of the pixel [43] is modulated by LNLUT #2. In a case where the thin line pattern is a pattern C of pattern number 4, the pixel value of the pixel [32] is modulated by LNLUT #2. In a case where the thin line pattern is a pattern D of pattern number 4, the pixel value of the pixel [23] is modulated by LNLUT #2.

The thin line correction value determination unit 903 substitutes "1" in the thin line correction flag LN_FLAG, and ends the process. For example, when the 7×7 pixels 1407 shown in FIG. 14F are given as the judgment image, the thin line pattern data is "4", and thus "2" is substituted in the thin line correction flag LN_FLAG and is output as with a pixel 1408 shown in FIG. 14G. Since the pixel value of the thin line is 255, "10" is obtained as the correction value by referring to the one-dimensional lookup table LNLUT #2 in FIG. 12B. Thus, as with the pixel 1409 shown in FIG. 14H, "10" is output as thin line correction data.

In step S1012, the thin line correction value determination unit 903 determines that the pixel of interest is a pixel adjacent to a white thin line, and calculates LN_DATA by referring to the one-dimensional lookup table LNLUT #3 that is a lookup table to be referred to when the pixel of interest is a pixel adjacent to a white thin line. The thin line correction value determination unit 903 modulates the pixel value of the adjacent thin line with the one-dimensional lookup table LNLUT #3, and outputs the modulated value as the thin line correction data LN_DATA. The thin line correction value determination unit 903 substitutes "3" in the thin line correction flag LN_FLAG, and ends the process.

As described above, by performing the thin line correction process, the line width of the thin line can be controlled as shown in FIG. 14H.

The present embodiment has been described above for a case where the processes in S1003 to S1006 are performed repeatedly using the single pattern matching circuit, but the present embodiment is not limited to this example. For example, a plurality of pattern matching circuits may be provided and the processes may be performed in parallel.

The thin line correction method is not limited to that described above, but various methods may be employed. For example, a thin line may be detected and corrected using a neural network having parameters obtained via learning.

Image Composition Unit 304

Figure 13:
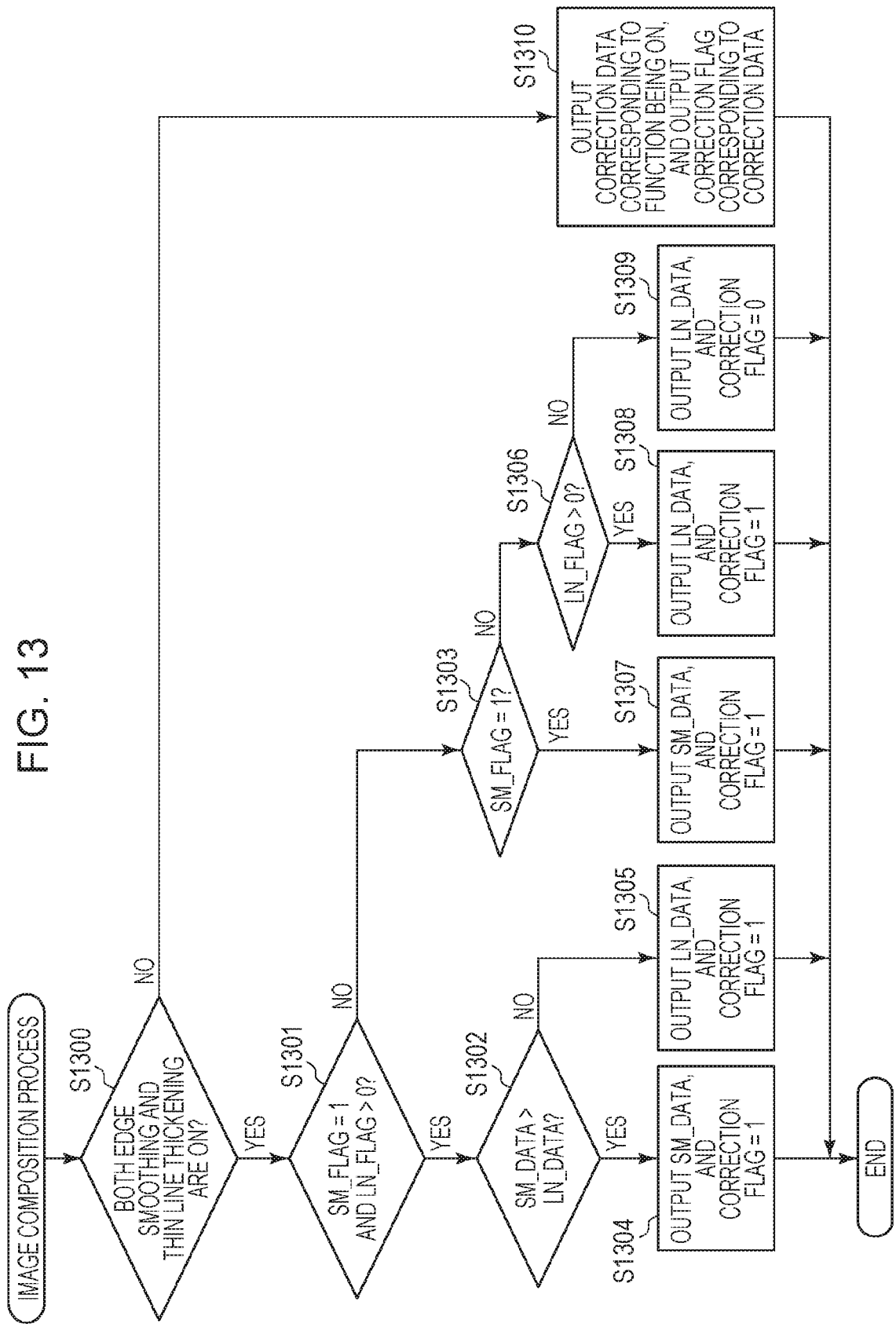
FIG. 13 is a flow chart illustrating an example of an image output process performed by an image processing unit.

The image composition process performed by the image composition unit 304 according to the present embodiment is described in detail below. FIG. 13 is a flow chart of the image composition process according to the present embodiment. FIG. 13 shows a flow chart used in explaining the control executed by the image composition unit 304 realized by a hardware circuit such as an ASIC. In the present embodiment, it is assumed by way of example that the process described in the flow chart shown in FIG. 13 is performed by a hardware circuit. However, the method of performing the process is not limited to that using the hardware circuit. For example, in an alternative implementation, a processor may read a program for image processing and may perform image processing on an input image.

First, in S1300, the image composition unit 304 determines whether both the edge smoothing function and the thin line thickening function are set to be ON. More specifically, the determination is performed based on information notified, when the apparatus is started, from a controller and stored in the configuration memory of the image composition unit 304 in terms of the setting of functions in the image process. In a case where it is determined that the edge smoothing function and the thin line thickening function are both set to be ON, the process proceeds to S1301. On the other hand, in a case where only one of the functions is ON or both functions are OFF, the process proceeds to S1310.

In step S1301, the image composition unit 304 determines whether the pixel of interest is a pixel to be subjected to both the smoothing process and the thin line correction process. When SM_FLAG associated with the pixel of interest is "1" and LN_FLAG is larger than "0", it is determined that the pixel of interest is a pixel to be subjected to both the smoothing process and the fine line correction process, and the process proceeds to step S1302.

Next, in step S1302, the image composition unit 304 compares SM_DATA and LN_DATA, and outputs a larger one as correction data. That is, the logical sum of SM_DATA and LN_DATA is output. In a case where SM_DATA is larger than LN_DATA, the process proceeds to step S1304. In a case where SM_DATA is smaller than or equal to LN_DATA, the process proceeds to step S1305.

In step S1303, the image composition unit 304 determines whether the pixel of interest is a pixel to be subjected to the smoothing process. In a case where SM_FLAG is "1", the process proceeds to step S1307. In a case where SM_FLAG is "0", the process proceeds to step S1306.

In step S1304, the image composition unit 304 outputs SM_DATA as correction data. Furthermore, "1" is substituted in the correction flag and is output.

In step S1305, the image composition unit 304 outputs LN_DATA as correction data. Furthermore, "1" is substituted in the correction flag and is output.

In step S1306, the image composition unit 304 determines whether the pixel of interest is a pixel to be subjected to the thin line correction process. In a case where LN_FLAG is greater than "0", the process proceeds to step S1308. In a case where LN_FLAG is "0", the process proceeds to step S1309.

In step S1307, the image composition unit 304 determines that the pixel of interest is a pixel to be subjected to the smoothing processing, and outputs SM_DATA as correction data. Furthermore, "1" is substituted in the correction flag and is output. In step S1308, the image composition unit 304 determines that the pixel of interest is a pixel to be subjected to the thin line correction process, and outputs LN_DATA as correction data. Furthermore, "1" is substituted in the correction flag and is output. In step S1309, the image composition unit 304 determines that the pixel of interest is a pixel to be subjected to the thin line correction process, and outputs LN_DATA as correction data. Furthermore, "0" is substituted in the correction flag and is output.

On the other hand, in S1310, the image composition unit 304 outputs the correction data associated with the function being ON and the correction flag associated with the correction data. More specifically, in a case where the thin line correction function is set to be ON and the edge smoothing function is set to be OFF, LN_DATA is output as correction data, and correction flags corresponding to the respective pixels, where correction values of the respective pixels of SM_DATA are stored, are generated. On the other hand, in a case where the thin line correction function is set to be OFF and the edge smoothing function is set to be ON, SM_DATA is output as correction data, and correction flags corresponding to the respective pixel values of SM_DATA are output. When both functions are OFF, output data is generated and an associated correction flag is set to 0.

The series of processes described above is executed on each pixel of interest in the input data, and correction data and a correction flag corresponding to the input image are generated.

Printing Process

The correction data and the correction flag output from the image correction processing unit 204 are input to the image selection unit 205 of the image processing unit 105 as described above with reference to FIG. 2. The image selection unit 205 generates an output image by correcting the halftone image processed by the screen processing unit 203 based on the correction data and the correction flag. More specifically, either the halftone image received as the screen data from the screen processing unit 203 or the correction data received from the image correction processing unit 204 is selected and output. In a case where the correction flag is "1", it is determined that the pixel is a pixel to be subjected to the correction, and correction data is output. When the correction flag is "0", it is determined that the pixel is not a pixel to be subjected to the correction process, and screen data is output. Thereafter, the output image obtained via the image composition process is output to the engine I/F unit 106. The print engine 22 prints an image on a sheet based on the output image received via the engine I/F.

Specific Examples of Image Processing

A series of image processing shown in FIG. 13 is further described for a specific case where the pixel of interest is the pixel 1401. In step S1301, the pixel 1404 is "1" and the pixel 1407 is greater than "0", and thus the image composition unit 304 determines that the pixel of interest is a pixel to be subjected to both processes. Therefore, the process proceeds to step S1302. In step S1302, the image composition unit 304 compares SM_DATA and LN_DATA. The pixel 1405 in SM_DATA is "5", and the pixel 1409 in LN_DATA is "10". Since LN_DATA is larger than SM_DATA, the process proceeds to step S1305.

In step S1305, the image composition unit 304 outputs "10" of LN_DATA as correction data. As a result, the pixel 1413 of the correction data is set to "10". Then, the image composition unit 304 substitutes "1" in the pixel 1416 of the correction flag and outputs the result.

Here, for comparison, the process is described for a case where higher priority is given to the smoothing process over the thin line correction process as in the conventional method. In a case where the pixel 1401 is the pixel of interest, the pixel 1404 of the smoothing flag is "1", and thus smoothing data is output as the correction data. Accordingly, the pixel value "5" of the pixel 1405 of the smoothing data is output as the pixel value of the pixel 1410 of the correction data. Thus, in the conventional method, an abrupt change in the signal value occurs, and jaggies appear at the edge.

In contrast, the process shown in FIG. 13 is executed as follows. The thin line correction data obtained via the thin line correction process is compared with the smoothing data obtained via the smoothing process, and a larger one is output as the correction data. Thus, as shown in FIG. 14K, an abrupt change in signal value is prevented. The pixel 1413 of the correction data is "10", and the adjacent pixels 1414 and 1415 also have a signal value "10". Thus, an abrupt change in the signal value is prevented.

Figure 17A:
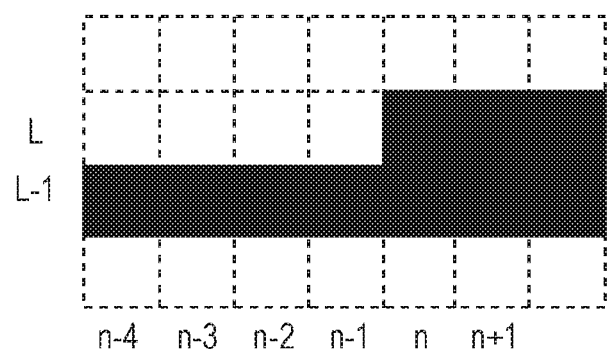
FIGS. 17A to 17C are diagrams illustrating an output result and an effect thereof obtained when a smoothing process and a thickening process according to the present disclosure are applied.
Figure 17B:
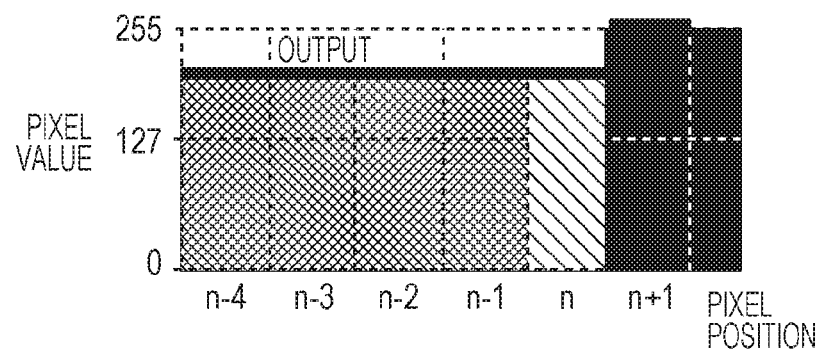
Figure 17C:
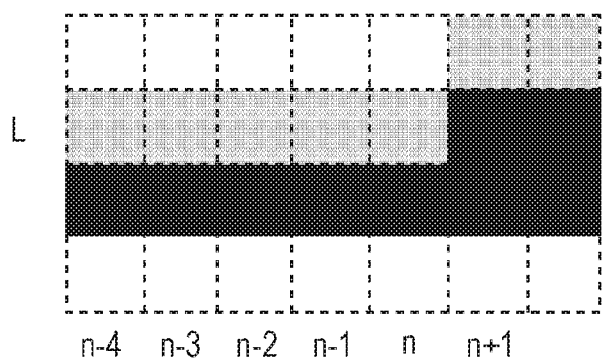

Finally, effects of the processing according to the present embodiment are described below with reference to FIGS. 17A to 17C. When an image shown in FIG. 17A is subjected to the process according to the present embodiment, a resultant image such as that shown in FIG. 17C is obtained. FIG. 17B shows an example in which a pixel at a pixel location n–1 is subjected to both the smoothing process and the thickening process, and a greater one of output values obtained via the respective processes is employed as a result. Shaded parts indicate pixels to which pixel values obtained as a result of the thickening process are applied, while hatched parts indicate pixels to which pixel values obtained as a result of the smoothing process are applied. In the example shown in FIG. 17B, the output value obtained as a result of the thickening process is applied to the pixel at the pixel location n–1.

As a result, a correction result is obtained as shown in FIG. 17C is obtained, and a smooth density representation is realized for pixels at pixel locations from n–2 to n. Thus, according to the present embodiment, a smooth edge expression is realized when the smoothing process and the line width correction process are performed.

Second Embodiment

In the first embodiment, the correction of a thin line having a density has been described. In a second embodiment, in addition to considerations in the process according to the first embodiment, a process on an open thin line is also taken into consideration. Note that the "open thin line" refers to a thin line formed by white pixels surrounded by pixels having a high density.

Figure 15:
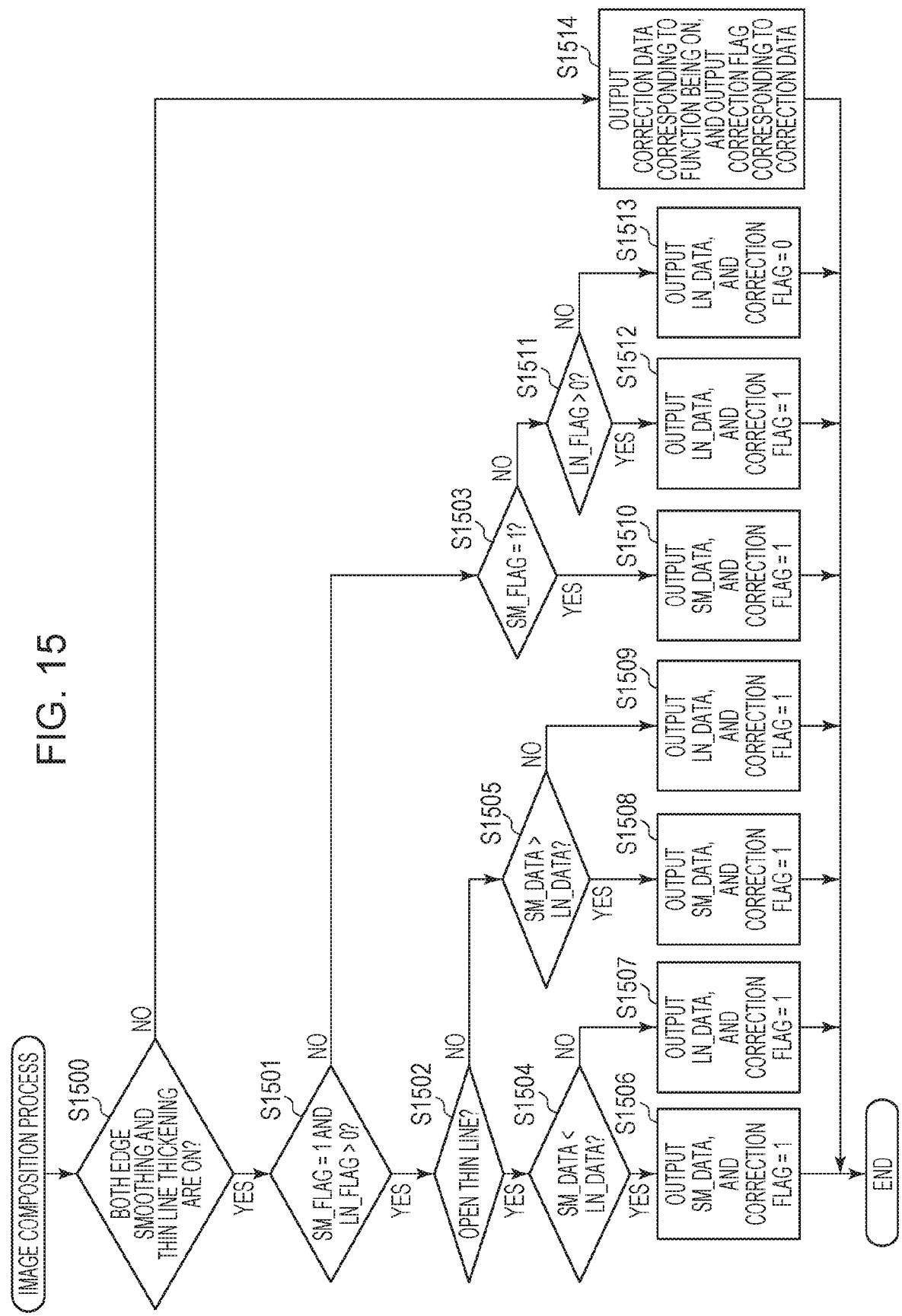
FIG. 15 is a flow chart illustrating an example of an image output process according to a second embodiment.

An image composition process performed by the image composition unit 304 according to the second embodiment is described in detail below. FIG. 15 is a flow chart of the image composition process that is executed instead of the process shown in FIG. 13 according to the first embodiment.

Figures 16A, 16B, 16C, 16D, 16E, 16F, 16G, 16H, 16I, 16J, 16K:
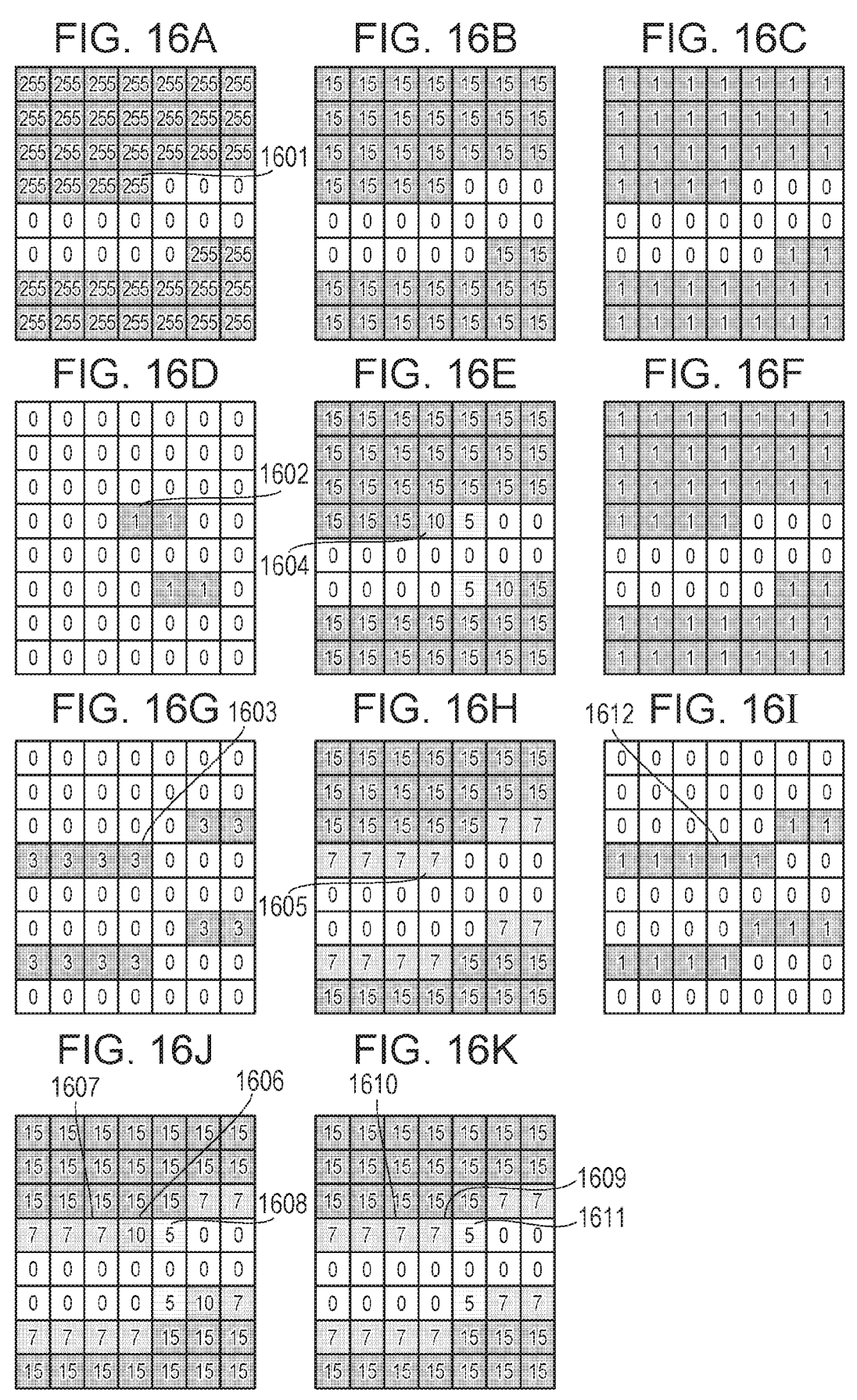

FIGS. 16A to 16K are diagrams for illustrating a processing result. FIG. 16A illustrates an example of an input image applied to the image correction processing unit 204. FIG. 16B illustrates an example of an output result given by the screen processing unit 203. FIG. 16C illustrates an example of a result of a process performed by the binarization processing unit 501. FIG. 16D illustrates an example of a smoothing flag output from the smoothing processing unit 302. FIG. 16E illustrates an example of smoothing data output from the smoothing processing unit 302. FIG. 16F illustrates an example of a result of a process performed by the thin line binarization processing unit 901.

FIG. 16G illustrates an example of a thin line correction flag output from the thin line correction processing unit 303. FIG. 16H illustrates an example of thin line correction data output from the thin line correction processing unit 303. FIG. 16G illustrates an example of a correction flag output from the image composition unit 304. FIG. 16J illustrates an example of correction data according to the first embodiment. FIG. 16K illustrates an example of correction data output from the image composition unit 304 according to the second embodiment.

In step S1500, the image composition unit 304 determines whether both the edge smoothing function and the thin line thickening function are set to be ON. In a case where it is determined that both the edge smoothing function and the thin line thickening function are set to be ON, the process proceeds to S1501. On the other hand, in a case where only one of the functions is ON or both the functions are OFF, the process proceeds to S1514. The process in S1514 is the same as the process in S1310 according to the first embodiment, and thus a description thereof is omitted.

First, in step S1501, the image composition unit 304 determines whether a pixel of interest is a pixel to be subjected to both the smoothing process and the thin line correction process. In a case where SM_FLAG associated with the pixel of interest is "1" and LN_FLAG is larger than "0", it is determined that the pixel of interest is a pixel to be subjected to both the smoothing process and the thin line correction process, and the process proceeds to step S1502.

Next, in step S1502, the image composition unit 304 determines whether the pixel of interest is a pixel adjacent to an open thin line. Patterns of pattern numbers 5 and 6 are detection patterns for detecting a pixel adjacent to an open thin line. Therefore, in a case where LN_FLAG is "3", it is determined that the pixel of interest is a pixel adjacent to an open thin line, and the process proceeds to step S1504. In a case where LN_FLAG is other than "3", it is determined that the pixel of interest is not a pixel adjacent to an open thin line, and the process proceeds to step S1505.

In step S1504, the image composition unit 304 compares SM_DATA and LN_DATA, and outputs smaller one as correction data. In a case where SM_DATA is smaller than LN_DATA, the process proceeds to step S1506. In a case where SM_DATA is larger than or equal to LN_DATA, the process proceeds to step S1507.

In step S1506, the image composition unit 304 outputs SM_DATA as correction data. Furthermore, "1" is substituted in the correction flag and is output. In step S1507, the image composition unit 304 outputs LN_DATA as correction data. Furthermore, "1" is substituted in the correction flag and is output.

In step S1505, the image composition unit 304 determines that the pixel of interest is not an open thin line. The image composition unit 304 compares SM_DATA and LN_DATA and outputs larger data as correction data. In a case where SM_DATA is larger than LN_DATA, the process proceeds to step S1508. In a case where SM_DATA is smaller than or equal to LN_DATA, the process proceeds to step S1509.

In step S1508, the image composition unit 304 outputs SM_DATA as correction data. Furthermore, "1" is substituted in the correction flag and is output. In step S1509, the image composition unit 304 outputs LN_DATA as correction data. Furthermore, "1" is substituted in the correction flag and is output. In step S1503, the image composition unit 304 determines whether the pixel of interest is a pixel to be subjected to the smoothing processing. In a case where SM_FLAG is "1", the process proceeds to step S1510. In a case where SM_FLAG is "0", the process proceeds to step S1511.

In step S1510, the image composition unit 304 determines that the pixel of interest is a pixel to be subjected to the smoothing processing, and outputs SM_DATA as correction data. Furthermore, "1" is substituted in the correction flag and is output.

In step S1511, the image composition unit 304 determines whether the pixel of interest is a pixel to be subjected to the thin line correction process. In a case where LN_FLAG is greater than "0", the process proceeds to step S1512. In a case where LN_FLAG is "0", the process proceeds to step S1513.

In step S1512, the image composition unit 304 determines that the pixel of interest is a pixel to be subjected to the thin line correction process, and outputs LN_DATA as correction data. Furthermore, "1" is substituted in the correction flag and is output. In step S1513, the image composition unit 304 outputs LN_DATA as correction data. Furthermore, "0" is substituted in the correction flag and is output.

Specific Examples of Image Processing

An example of image processing is described below for a case where a pixel 1601 is the pixel of interest. In the present example, the pixel 1602 is "1" and the pixel 1603 is larger than "0". Therefore, in step S1501 the image composition unit 304 determines that the pixel of interest is a pixel to be subjected to both the processes. Thus, the process proceeds to step S1502.

In step S1502, the image composition unit 304 determines whether the pixel of interest is a pixel adjacent to an open thin line. Since the pixel 1603 in LN_FLAG is "3", it is determined that the pixel of interest is a pixel adjacent to an open thin line, and the process proceeds to step S1504.

In step S1504, the image composition unit 304 compares SM_DATA and LN_DATA. The pixel 1604 in SM_DATA is "10", and the pixel 1605 in LN_DATA is "7". Since LN_DATA is smaller than SM_DATA, the process proceeds to step S1507.

In step S1507, the image composition unit 304 outputs "7" of LN_DATA as correction data. Accordingly, the pixel 1609 in FIG. 16K is set to "7". Then, the image composition unit 304 substitutes "1" in the pixel 1612 of the correction flag and outputs the result.

In the case of the first embodiment, since a larger one of SM_DATA and LN_DATA is output, the correction data is "10" of SM_DATA having the larger value. Even in a case where the smoothing process is prioritized over the thin line correction process as in the conventional method, "10" of SM_DATA is output as the correction data.

As described above, in the case of the first embodiment, there can be an abrupt change in signal value between a pixel, for which correction processes conflict, and an adjacent pixel. The signal value of the pixel 1606 of the correction data is "10", whereas the pixel 1607 is "7" and the pixel 1608 is "5", and thus an abrupt change in the signal value occurs.

On the other hand, in a case where a correction is performed on a pixel adjacent to an open line, the thin line correction data obtained as a result of the thin line correction process is compared with the smoothing data obtained as a result of the smoothing process, and a smaller one is output as correction data. Accordingly, as shown in FIG. 16 (k), it is possible to prevent an abrupt change in the signal value. As a result, the pixel 1609 of the correction data is "7", the adjacent pixel 1610 is "7", and the signal value of the pixel 1611 is "5", which indicates that an abrupt change in the signal value is prevented.

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

In one aspect of the present disclosure, when a plurality of image processes including a smoothing process are applied to an image, it is possible to output a result that gives a less unnatural feeling to a user. In another aspect of the present disclosure, even in a case where both the smoothing process and the line width correction process are performed on an image, a smooth edge expression can be achieved in an image obtained after both the processes are performed.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-218285, filed Nov. 21, 2018 which is hereby incorporated by reference herein in its entirety.

What is claimed is:
1. An apparatus comprising:
a first correction unit configured to detect an edge part of an input image and correct a pixel value in the detected edge part;

a second correction unit configured to detect a thin line in the input image and correct a pixel value in the detected thin line; and an output unit configured to set a pixel value such that in a case where a pixel is subjected to pixel value corrections by both the first correction unit and the second correction unit, the pixel value is set to be equal to a greater one of a pixel value obtained as result of the correction by the first correction unit and a pixel value obtained as a result of the correction by the second correction unit.

2. The apparatus according to claim 1, further comprising a generation unit configured to perform halftone processing on the input image for generating a halftone image with a gradation lower than a gradation of the input image, wherein the output unit outputs an output image obtained as a result of correcting a pixel of interest in the generated halftone image based on the selected pixel of interest.

3. The apparatus according to claim 1, further comprising a printing unit configured to print an image on a sheet, wherein the printing unit prints the image on the sheet based on the set pixel value.

4. The apparatus according to claim 1, wherein in a case where correcting an edge part and correcting a thin line are both set to be performed, the larger pixel value is set in the pixel.

5. A method comprising:
performing a first correction process to detect an edge part of an input image and correct a pixel value in the detected edge part;
performing a second correction process to detect a thin line in the input image and correct a pixel value in the detected thin line; and
outputting such that in a case where a pixel is subjected to pixel value corrections both in the first correction process and the second correction process, the pixel value of the pixel is set to be equal to a greater one of a pixel value obtained as result of the correction by the first correction process and a pixel value obtained as a result of the correction by the second correction process.

6. The method according to claim 5, further comprising performing generating by performing halftone processing on the input image thereby generating a halftone image with a gradation lower than a gradation of the input image, wherein in the outputting, an output image obtained as a result of correcting a pixel of interest in the generated halftone image based on the selected pixel of interest is output.

7. The method according to claim 5, further comprising printing an image on a sheet,
wherein the printing prints the image on the sheet based on the set pixel value.

8. The method according to claim 5, wherein
in the outputting, in a case where correcting an edge portion and correcting a thin line are both set to be performed, the larger pixel value is set in the pixel.

9. A non-transitory storage medium storing a program for causing a computer to execute a method, the method comprising:
performing a first correction process to detect an edge part of an input image and correct a pixel value in the detected edge part;
performing a second correction process to detect a thin line in the input image and correct a pixel value in the detected thin line; and
outputting such that in a case where a pixel is subjected to pixel value corrections both in the first correction process and the second correction process, the pixel value of the pixel is set to be equal to a greater one of a pixel value obtained as result of the correction by the first correction process and a pixel value obtained as a result of the correction by the second correction process.

10. The non-transitory storage medium according to claim 9, further comprising
performing generating by performing halftone processing on the input image thereby generating a halftone image with a gradation lower than a gradation of the input image,
wherein in the outputting, an output image obtained as a result of correcting a pixel of interest in the generated halftone image based on the selected pixel of interest is output.

11. The non-transitory storage medium according to claim 9, further comprising:
printing an image on a sheet,
wherein the printing prints the image on the sheet based on the set pixel value.

12. The non-transitory storage medium according to claim 9, wherein
in the outputting, in a case where correcting an edge portion and correcting a thin line are both set to be performed, the larger pixel value is set in the pixel.

* * * * *